(12) United States Patent
Pang et al.

(10) Patent No.: US 10,937,056 B2
(45) Date of Patent: Mar. 2, 2021

(54) ADVERTISEMENT DISPLAY CONTROL METHOD, TERMINAL, AND ADVERTISEMENT SERVER

(71) Applicant: Huawei Technologies Co., Ltd., Shenzhen (CN)

(72) Inventors: Huangang Pang, Nanjing (CN); Yingbo Hu, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 12 days.

(21) Appl. No.: 16/479,771

(22) PCT Filed: Jun. 9, 2017

(86) PCT No.: PCT/CN2017/087731
§ 371 (c)(1),
(2) Date: Jul. 22, 2019

(87) PCT Pub. No.: WO2018/133297
PCT Pub. Date: Jul. 26, 2018

(65) Prior Publication Data
US 2020/0175549 A1    Jun. 4, 2020

(30) Foreign Application Priority Data
Jan. 20, 2017    (CN) .......................... 201710048172.X

(51) Int. Cl.
*G06Q 30/02*    (2012.01)
*H04N 21/262*    (2011.01)
(Continued)

(52) U.S. Cl.
CPC ... *G06Q 30/0255* (2013.01); *H04N 21/26241* (2013.01); *H04N 21/4316* (2013.01); *H04N 21/4331* (2013.01)

(58) Field of Classification Search
CPC .................................................. G06Q 30/02
(Continued)

(56) References Cited

U.S. PATENT DOCUMENTS

2012/0150639 A1    6/2012  Li et al.
2016/0292734 A1    10/2016 Jia

FOREIGN PATENT DOCUMENTS

CN    1897028 A     1/2007
CN    101420580 A   4/2009
(Continued)

OTHER PUBLICATIONS

Machine Translation and Abstract of Chinese Publication No. CN1014220580, Apr. 29, 2009, 31 pages.
(Continued)

*Primary Examiner* — Afaf Osman Bilal Ahmed
(74) *Attorney, Agent, or Firm* — Conley Rose, P.C.

(57) ABSTRACT

A terminal sends a first advertisement request to an advertisement server, where the first advertisement request includes a device identifier of the terminal and an advertisement slot identifier of a first client on the terminal. The advertisement server determines a target advertisement and first permission information according to the first advertisement, request, and returns the target advertisement and the first permission information to the terminal. The first permission information is permission information that is determined by the advertisement server based on the device identifier and that is used to instruct the first client to display the target advertisement. The terminal controls, based on the received first permission information, the target advertisement to be displayed on the first client.

20 Claims, 8 Drawing Sheets

(51) Int. Cl.
*H04N 21/431* (2011.01)
*H04N 21/433* (2011.01)

(58) Field of Classification Search
USPC ..................................................... 705/14.1
See application file for complete search history.

(56) References Cited

FOREIGN PATENT DOCUMENTS

| | | | |
|---|---|---|---|
| CN | 101996371 | A | 3/2011 |
| CN | 102223358 | A | 10/2011 |
| CN | 103369101 | A | 10/2013 |
| CN | 103647755 | A | 3/2014 |
| CN | 103647756 | A | 3/2014 |
| CN | 103679509 | A | 3/2014 |
| CN | 104077715 | A | 10/2014 |
| CN | 104966215 | A | 10/2015 |
| CN | 105654344 | A | 6/2016 |
| CN | 105978967 | A | 9/2016 |
| EP | 1078490 | A2 | 2/2001 |
| WO | 9959283 | A2 | 11/1999 |

OTHER PUBLICATIONS

Machine Translation and Abstract of Chinese Publication No. CN103647755, Mar. 19, 2014, 14 pages.
Machine Translation and Abstract of Chinese Publication No. CN103647756, Mar. 19, 2014, 15 pages.
Machine Translation and Abstract of Chinese Publication No. CN104077715, Oct. 1, 2014, 10 pages.
Machine Translation and Abstract of Chinese Publication No. CN104966215, Oct. 7, 2015, 27 pages.
Machine Translation and Abstract of Chinese Publication No. CN105978967, Sep. 28, 2016, 21 pages.
Foreign Communication From a Counterpart Application, PCT Application No. PCT/CN2017/087731, English Translation of International Search Report dated Oct. 19, 2017, 2 pages.
Foreign Communication From a Counterpart Application, PCT Application No. PCT/CN2017/087731, English Translation of Written Opinion dated Oct. 19, 2017, 5 pages.

ADVERTISEMENT DISPLAY CONTROL METHOD, TERMINAL, AND ADVERTISEMENT SERVER

This application is a National Stage of International Patent Application No. PCT/CN2017/087731, filed on Jun. 9, 2017, which claims priority to Chinese Patent Application No. 201710048172.X, filed on Jan. 20, 2017. Both of the aforementioned applications are hereby incorporated by reference in their entireties.

TECHNICAL FIELD

Embodiments of this application relate to the field of network technologies, and in particular, to an advertisement display control method, a terminal, and an advertisement server.

BACKGROUND

As mobile terminals such as smartphones, tablet computers, and TV boxes develop and a mobile network speed continuously increases, more users tend to spend more time on the mobile terminals. While the mobile terminals become a mainstream of mobile network devices, advertisements on the mobile terminals serving as a new type of medium become increasingly valuable in application. The advertisements on the mobile terminals can be used to propagate information rapidly, and therefore the value of mobile advertising has been accepted by advertisers.

At present, when a user starts a client installed on a terminal, and an advertisement software development kit (Software Development Kit, SDK) is integrated into the client, the terminal sends an advertisement request to an advertisement server of an advertising system. The advertisement server returns, according to the advertisement request, a target advertisement and a maximum quantity of per-day display times of the target advertisement to the terminal. The terminal returns the target advertisement and the maximum quantity of per-day display times to the corresponding client, and stores the target advertisement and the maximum quantity of per-day display times in the local client. The advertisement SDK integrated into the client is used to control the maximum quantity of per-day display times of the target advertisement on the client, until an advertisement delivery time of the target advertisement ends.

However, when advertisement SDKs of a same advertising system are integrated into a plurality of clients on one terminal, the clients access the same advertising system. Because the clients on the terminal are independent of each other, only a quantity of per-day display times of a target advertisement on a single client can be controlled by using the foregoing advertisement display control method, but the target advertisement cannot be controlled to be displayed on the plurality of clients on the terminal. Consequently, the control manner is unitary and flexibility is low, and a control requirement of an advertiser cannot be met.

In conclusion, the target advertisement cannot be controlled to be displayed on the plurality of clients on the same terminal by using the existing advertisement display control method, and consequently the control manner is unitary and flexibility is low.

SUMMARY

Embodiments of this application provide an advertisement display control method, a terminal, and an advertisement server, to resolve the following problem: A target advertisement cannot be centrally controlled to be displayed on a plurality of clients on one terminal by using an existing advertisement display control method, and consequently the control manner is unitary and flexibility is low.

A first aspect of the embodiments of this application provides an advertisement display control method, applicable to a terminal. The method includes: sending, by the terminal, a first advertisement request to an advertisement server, where the first advertisement request includes a device identifier of the terminal and an advertisement slot identifier of a first client on the terminal; receiving a target advertisement and first permission information that are returned by the advertisement server according to the first advertisement request, where the first permission information is permission information that is determined by the advertisement server based on the device identifier and that is used to instruct the first client to display the target advertisement; and finally controlling, based on the first permission information, the target advertisement to be displayed on the first client.

According to the advertisement display control method provided in the first aspect, the terminal can control, based on the target advertisement and the first permission information that are returned by the advertisement server, the target advertisement to be displayed on a plurality of clients on the same terminal. The control manner is flexible and has high accuracy.

In an embodiment of the first aspect of this application, the first permission information is determined by the advertisement server after the advertisement server queries the terminal for statistical information of the target advertisement based on the device identifier, and the statistical information includes advertisement display information of all clients on the terminal that display the target advertisement.

In this embodiment of this application, the advertisement server determines the first permission information based on the advertisement display information of all the clients on the terminal that display the target advertisement, thereby providing a premise for the terminal to control the same advertisement to be displayed on a plurality of clients.

In another embodiment of the first aspect of this application, the method further includes:

after the first client displays the target advertisement, reporting, by the terminal, an advertisement display notification to the advertisement server, so that the advertisement server updates the statistical information of the target advertisement based on the advertisement display notification, where the advertisement display notification includes the device identifier of the terminal, the advertisement slot identifier of the first client, and a material identifier of the target advertisement.

In this embodiment of this application, after displaying the target advertisement on the first client, the terminal reports the advertisement display notification to the advertisement server in a timely manner, so that the advertisement server can update the statistical information of the target advertisement in a timely manner. This provides a premise for the advertisement server to determine accurate permission information of the target advertisement.

In the embodiments of the first aspect of this application, the method further includes: sending, by the terminal, a second advertisement request to the advertisement server, so that the advertisement server determines, based on updated statistical information of the target advertisement, second permission information that is used to instruct a second client on the terminal to display the target advertisement. The second advertisement request includes the device identifier of the terminal and an advertisement slot identifier of the second client on the terminal.

In the embodiments of this application, when the terminal sends the second advertisement request to the advertisement server, the advertisement server determines, based on the updated statistical information of the target advertisement, the second permission information that is used to instruct the second client on the terminal to display the target advertisement. This ensures accuracy of statistical information of an advertisement stored in the advertisement server.

In still another embodiment of the first aspect of this application, the first permission information includes display frequency information and valid display time information.

In yet another embodiment of the first aspect of this application, the controlling, by the terminal based on the target advertisement and the first permission information, the target advertisement to be displayed on the first client includes: caching, by the terminal, the target advertisement and the first permission information into a directory corresponding to the first client; and controlling, by the terminal based on the display frequency information, the first client to display the target advertisement within a time range corresponding to the valid display time information.

The terminal may first cache the requested target advertisement and the requested first permission information into the directory corresponding to the first client, so that when an application corresponding to the first client is started subsequently, the terminal can control, based on the first permission information, the first client to display the target advertisement within the time range corresponding to the valid display time information. This reduces a time for downloading and caching the target advertisement, and improves user experience.

In still yet another embodiment of the first aspect of this application, the first advertisement request further includes a material identifier list cached into the directory corresponding to the first client.

The first permission information further includes permission information that is determined by the advertisement server based on the device identifier and that is used to instruct the first client to display an advertisement corresponding to each material identifier in the material identifier list.

When the terminal sends the first advertisement request to the advertisement server, the material identifier list cached into the directory corresponding to the first client is carried by the first advertisement server, so that the advertisement server can return the permission information of the advertisement corresponding to each material identifier in the material identifier list. This ensures that the terminal controls the advertisement corresponding to each material identifier to be displayed accurately.

In the embodiments of the first aspect of this application, when the first permission information is invalid permission, the method further includes: removing, by the terminal, an advertisement corresponding to the invalid permission from the directory corresponding to the first client.

The advertisement corresponding to the invalid permission is removed from the directory corresponding to the first client, so that a case in which the terminal displays the advertisement whose permission information is the invalid permission is avoided, and advertisement display accuracy is improved.

A second aspect of the embodiments of this application provides an advertisement display control method, applicable to an advertisement server. The method includes: receiving, by the advertisement server, a first advertisement request sent by a terminal, where the first advertisement request includes a device identifier of the terminal and an advertisement slot identifier of a first client on the terminal; determining a target advertisement and first permission information according to the first advertisement request, where the first permission information is permission information that is determined by the advertisement server based on the device identifier and that is used to instruct the first client to display the target advertisement; and finally returning the determined target advertisement and the determined first permission information to the terminal, so that the terminal controls, based on the first permission information, the target advertisement to be displayed on the first client.

In the embodiments of this application, the advertisement server may determine, according to the first advertisement request sent by the terminal, the target advertisement and the first permission information that are corresponding to the first advertisement request, and return the target advertisement and the first permission information to the terminal, so that the terminal can perform accurate control. The control manner is flexible and has high accuracy.

In an embodiment of the second aspect of this application, the determining, by the advertisement server, first permission information according to the first advertisement request includes: querying, by the advertisement server, the terminal for statistical information of the target advertisement based on the device identifier, where the statistical information includes advertisement display information of all clients on the terminal that display the target advertisement; and determining, by the advertisement server, the first permission information based on the statistical information of the target advertisement.

The advertisement server determines the first permission information by querying the terminal for the advertisement display information of all the clients displaying the target advertisement, thereby providing a premise for the terminal to control the target advertisement to be displayed on a plurality of clients.

In another embodiment of the second aspect of this application, the method further includes:

after the first client displays the target advertisement, receiving, by the advertisement server, an advertisement display notification reported by the terminal, where the advertisement display notification includes the device identifier of the terminal, the advertisement slot identifier of the first client, and a material identifier of the target advertisement; and updating, by the advertisement server, the statistical information of the target advertisement based on the advertisement display notification.

The advertisement server updates the statistical information of the target advertisement in a timely manner based on the advertisement display notification reported by the terminal. This ensures accuracy of the statistical information, of the material identifier, obtained by the advertisement server by querying the memory.

In the embodiments of the second aspect of this application, the method further includes: receiving, by the advertisement server, a second advertisement request sent by the terminal, where the second advertisement request includes the device identifier of the terminal and an advertisement slot identifier of a second client on the terminal; and querying, by the advertisement server, the terminal for updated statistical information of the target advertisement according to the second advertisement request, to determine second permission information, where the second permission information is used to instruct the terminal to control the target advertisement to be displayed on the second client.

When receiving the second advertisement request that is sent by the terminal for the second client, the advertisement server queries the terminal for the updated statistical information of the target advertisement according to the second advertisement request. To be specific, the terminal interacts with the advertisement server in real time. This can ensure accuracy of statistical information, stored in the advertisement server, of an advertisement, and improve user experience.

In still another embodiment of the second aspect of this application, the first permission information includes display frequency information and valid display time information.

The display frequency information may be a quantity of allowed display times of the target advertisement on the first client. The valid display time information may be a time period in which the target advertisement is allowed to be displayed. The terminal controls advertisement display based on the first permission information. This reduces an error of advertisement display, and achieves high accuracy.

In yet another embodiment of the second aspect of this application, the first advertisement request further includes a material identifier list cached into a directory corresponding to the first client.

The first permission information further includes permission information that is determined by the advertisement server based on the device identifier and that is used to instruct the first client to display an advertisement corresponding to each material identifier in the material identifier list.

In the embodiments of the second aspect of this application, if the first permission information is invalid permission, the determining, by the advertisement server, first permission information according to the first advertisement request further includes: generating, by the advertisement server, a user flag based on the device identifier in the first advertisement request; generating, by the advertisement server, a total-times search keyword based on the user flag and each material identifier in the material identifier list, where a format of the total-times search keyword is consistent with a format of a statistical-information keyword in a memory; querying, by the advertisement server, the memory for statistical information of each material identifier in the material identifier list based on the total-times search keyword, to determine a total quantity of displayed times, on all the clients on the terminal within an advertisement delivery period, of the advertisement corresponding to each material identifier; and determining, by the advertisement server, permission information of an advertisement whose total quantity of displayed times within the advertisement delivery period is greater than or equal to a preset total quantity of display times as the invalid permission.

According to the technical solution, an advertisement whose permission information is restricted permission can be determined, thereby providing a premise for the terminal to control the advertisement to be displayed on different clients. The advertisement server can determine an advertisement whose permission information is the invalid permission, thereby providing a premise for the terminal to control the advertisement to be displayed on the different clients.

A third aspect of the embodiments of this application provides a terminal. The terminal includes:

a sending module, configured to send a first advertisement request to an advertisement server, where the first advertisement request includes a device identifier of the terminal and an advertisement slot identifier of a first client on the terminal;

a receiving module, configured to receive a target advertisement and first permission information that are returned by the advertisement server according to the first advertisement request, where the first permission information is permission information that is determined by the advertisement server based on the device identifier and that is used to instruct the first client to display the target advertisement; and a processing module, configured to control, based on the first permission information, the target advertisement to be displayed on the first client.

In an embodiment of the third aspect of this application, the first permission information is determined by the advertisement server after the advertisement server queries the terminal for statistical information of the target advertisement based on the device identifier, and the statistical information includes advertisement display information of all clients on the terminal that display the target advertisement.

In the embodiments of the third aspect of this application, the sending module is further configured to: after the first client displays the target advertisement, report an advertisement display notification to the advertisement server, so that the advertisement server updates the statistical information of the target advertisement based on the advertisement display notification. The advertisement display notification includes the device identifier of the terminal, the advertisement slot identifier of the first client, and a material identifier of the target advertisement.

In the embodiments of the third aspect of this application, the sending module is further configured to: send a second advertisement request to the advertisement server, so that the advertisement server determines, based on updated statistical information of the target advertisement, second permission information that is used to instruct a second client on the terminal to display the target advertisement. The second advertisement request includes the device identifier of the terminal and an advertisement slot identifier of the second client on the terminal.

In another embodiment of the third aspect of this application, the first permission information includes display frequency information and valid display time information.

In the embodiments of the third aspect of this application, the processing module is specifically configured to: cache the target advertisement and the first permission information into a directory corresponding to the first client; and control, based on the display frequency information, the first client to display the target advertisement within a time range corresponding to the valid display time information.

In still another embodiment of the third aspect of this application, the first advertisement request further includes a material identifier list cached into the directory corresponding to the first client, and the first permission information further includes permission information that is determined by the advertisement server based on the device identifier and that is used to instruct the first client to display an advertisement corresponding to each material identifier in the material identifier list.

In the embodiments of the third aspect of this application, when the first permission information is invalid permission, the processing module is further configured to remove an advertisement corresponding to the invalid permission from the directory corresponding to the first client.

A fourth aspect of this application provides an advertisement server, including:

a receiving module, configured to receive a first advertisement request sent by a terminal, where the first advertisement request includes a device identifier of the terminal and an advertisement slot identifier of a first client on the terminal;

a processing module, configured to determine a target advertisement and first permission information according to the first advertisement request, where the first permission information is permission information that is determined by the advertisement server based on the device identifier and that is used to instruct the first client to display the target advertisement; and a sending module, configured to return, the determined target advertisement and the determined first permission information to the terminal, so that the terminal controls, based on the first permission information, the target advertisement to be displayed on the first client.

In an embodiment of the fourth aspect of this application, the processing module is specifically configured to: query the terminal for statistical information of the target advertisement based on the device identifier, and determine the first permission information based on the statistical information of the target advertisement. The statistical information includes advertisement display information of all clients on the terminal that display the target advertisement.

In another embodiment of the fourth aspect of this application, the receiving module is further configured to: after the first client displays the target advertisement, receive an advertisement display notification reported by the terminal; and update the statistical information of the target advertisement based on the advertisement display notification. The advertisement display notification includes the device identifier of the terminal, the advertisement slot identifier of the first client, and a material identifier of the target advertisement.

In the embodiments of the fourth aspect of this application, the receiving module is further configured to receive a second advertisement request sent by the terminal, where the second advertisement request includes the device identifier of the terminal and an advertisement slot identifier of a second client on the terminal; and the processing module is further configured to query the terminal for updated statistical information of the target advertisement according to the second advertisement request, to determine second permission information. The second permission information is used to instruct the terminal to control the target advertisement to be displayed on the second client.

In still another embodiment of the fourth aspect of this application, the first permission information includes display frequency information and valid display time information.

In yet another embodiment of the fourth aspect of this application, the first advertisement request further includes a material identifier list cached into a directory corresponding to the first client; and the first permission information further includes permission information that is determined by the advertisement server based on the device identifier and that is used to instruct the first client to display an advertisement corresponding to each material identifier in the material identifier list.

In the embodiments of the fourth aspect of this application, if the first permission information is invalid permission, the processing module is further configured to: generate a user flag based on the device identifier in the first advertisement request; generate a total-times search keyword based on the user flag and each material identifier in the material identifier list, where a format of the total-times search keyword is consistent with a format of a statistical-information keyword in a memory; query the memory for statistical information of each material identifier in the material identifier list based on the total-times search keyword, to determine a total quantity of displayed times, on all the clients on the terminal within an advertisement delivery period, of the advertisement corresponding to each material identifier; and determine permission information of an advertisement whose total quantity of displayed times within the advertisement delivery period is greater than or equal to a preset total quantity of display times as the invalid permission.

A fifth aspect of the embodiments of this application provides an advertisement display control system. The system includes the terminal described in the third aspect and the advertisement server described in the fourth aspect. The terminal exchanges an advertisement message with the advertisement server.

A sixth aspect of the embodiments of this application provides a terminal. The terminal includes a processor and a memory. The memory is configured to store a program, and the processor invokes the program stored in the memory, to execute the method provided in the first aspect of this application.

A seventh aspect of the embodiments of this application provides an advertisement server. The advertisement server includes a processor and a memory. The memory is configured to store a program, and the processor invokes the program stored in the memory, to execute the method provided in the second aspect of this application.

An eighth aspect of the embodiments of this application provides a terminal, including at least one processing component (or a chip) configured to execute the method of the first aspect.

A ninth aspect of the embodiments of this application provides an advertisement server, including at least one processing component (or a chip) configured to execute the method of the second aspect.

A tenth aspect of the embodiments of this application provides a computer readable storage medium. The computer readable storage medium stores an instruction, and when the instruction runs on a computer, the computer executes the method of the first aspect.

An eleventh aspect of the embodiments of this application provides a computer program product including an instruction. When the product runs on a computer, the computer executes the method of the first aspect.

A twelfth aspect of the embodiments of this application provides a computer readable storage medium. The computer readable storage medium stores an instruction, and when the instruction runs on a computer, the computer executes the method of the second aspect.

A thirteenth aspect of the embodiments of this application provides a computer program product including an instruction. When the product runs on a computer, the computer executes the method of the second aspect.

In the foregoing aspects, the terminal sends the first advertisement request to the advertisement server, where the first advertisement request includes the device identifier of the terminal and the advertisement slot identifier of the first client on the terminal. The advertisement server determines the target advertisement and the first permission information according to the received first advertisement request, and returns the determined target advertisement and the determined first permission information to the terminal. The terminal receives the target advertisement and the first permission information, where the first permission information is permission information that is determined by the advertisement server based on the device identifier and that is used to instruct the first client to display the target advertisement. Finally, the terminal controls, based on the first permission information, the target advertisement to be displayed on the first client. In this way, the terminal can control, based on the target advertisement and the first permission information that are returned by the advertisement server, the target advertisement to be displayed on a plurality of clients on the same terminal. The control manner is flexible and has high accuracy.

BRIEF DESCRIPTION OF DRAWINGS

FIG. 9 is a schematic diagram of an interface for setting an advertisement task according to an embodiment of this application;

FIG. 10 is a schematic structural diagram of an embodiment of a terminal according to embodiments of this application;

DESCRIPTION OF EMBODIMENTS

Figure 1:
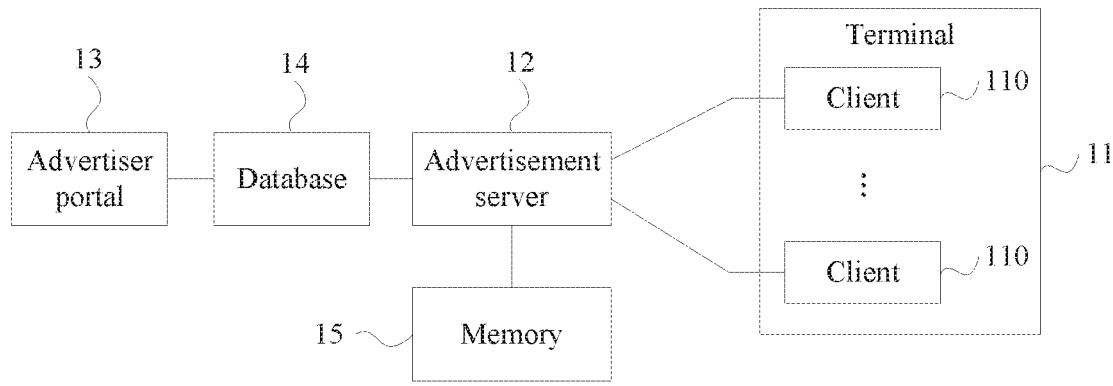
FIG. 1 is a schematic structural diagram of an advertisement display control system according to an embodiment of this application.

In the following, some terms in the embodiments of this application are explained, so that a person skilled in the art can understand:

Client: refers to an application installed on a terminal (such as a smartphone, a tablet computer, or a smart TV box), or an advertisement software development kit (Software Development Kit, SDK) integrated into an application.

Advertisement impression: is also referred to as advertisement display. One times of advertisement display is one impression.

Advertisement request: refers to a behavior of requesting, by a terminal, an advertisement server of an advertising system for an advertisement.

Advertisement slot ID: is an advertisement slot identifier on a client. The advertisement slot ID is obtained by a developer by applying to an advertising system. The advertisement slot ID is generated and issued by an advertisement server of the advertising system. When developing an application corresponding to a client, the developer integrates the advertisement slot ID into the application. On the advertisement server, there is a correspondence between an advertisement slot ID and a client, and the corresponding client on the terminal may be determined based on the advertisement slot ID.

Advertisement material ID: is an advertisement material identifier. An advertiser creates an advertisement task on an advertisement server in an advertising system, and the advertisement server allocates an ID, namely, an advertisement material ID, to a material in the advertisement task. The corresponding advertisement task may be determined based on the advertisement material ID.

Device identifier: can be used to uniquely identify a terminal, such as an international mobile equipment identity (International Mobile Equipment Identity, IMEI), a device identifier (Android ID) of an Android device, or a Media Access Control (Media Access Control, MAC) address. A device identifier on the same terminal is unique, and is irrelevant to a client. For example, if a plurality of applications are installed on a mobile phone of a user, the plurality of applications are corresponding to a same IMEI, a same Android ID, and a same MAC address, and the IMEI, the Android ID, and the MAC address can uniquely identify the terminal. The MAC address, also referred to as a physical address or a hardware address, does not change generally. The Android ID is a 64-bit number randomly generated by a system when an android device is initially started, and is stored on the device in a hexadecimal string form. Android is a name of an operating system.

Raw value: is a before-processed value. For example, a raw value of a MAC address of a mobile phone is 56:1C:78:05:26:68.

Advertisement cache mode: means that a corresponding client first caches an advertisement, requested by a terminal from an advertisement server currently, into a directory corresponding to a client, instead of currently displaying the advertisement, and does not display the advertisement until an application corresponding to the client is started subsequently.

Advertisement real-time mode: means that a corresponding client immediately displays an advertisement requested by a terminal from an advertisement server currently.

Cross-application advertisement delivery: means that a terminal may request advertisements from an advertisement server of a same advertising system for a plurality of clients installed on the terminal. For example, a plurality of applications are installed on a terminal. In other words, there are a plurality of applications on the terminal. When applications corresponding to the plurality of clients on the terminal are started, the terminal may request an advertisement from the advertisement server of the same advertising system for each client.

Redis: is an open-source high-performance key-value database.

Application background of the embodiments of this application is briefly described in the following.

With rapid development of mobile applications, traffic of the mobile applications is increasingly large, and the value of mobile advertising receives more popularity. However, for mobile advertising delivery, when there is specific advertisement budget, to deliver advertisements to more audience, advertisers expect an advertising system to manage and control a quantity of per-day display times of advertisements on a terminal, and to control a total quantity of display times of an advertisement on the terminal within an entire advertisement delivery period.

During an actual application, to facilitate integrating an advertisement into an application on a terminal, all advertising systems usually provide an advertisement SDK, so that a developer integrates the advertisement SDK into an application during application development. In addition, if a plurality of applications on the terminal need to display an advertisement, the advertisement SDK needs to be integrated into all of the plurality of applications on the terminal.

In an existing advertisement display control method, when a user starts a client (an advertisement SDK is integrated into an application corresponding to the client) installed on a terminal, the terminal initiates an advertisement request to an advertisement server of an advertising system, the advertisement server returns an advertisement response, and the terminal distributes the advertisement response to a corresponding client. The advertisement response includes a maximum quantity of per-day display times of an advertisement and a target advertisement. After obtaining the advertisement, the client may store the advertisement in a directory corresponding to the client, and the client controls the maximum quantity of per-day display times of the advertisement. When a quantity of given-day displayed times of the advertisement exceeds a preset maximum quantity of per-day display times, when the user restarts the client on a given day, the client prohibits the advertisement from being displayed, but allows the advertisement to be displayed on the other days.

When SDKs of a same advertising system are integrated into a plurality of clients on the terminal, the plurality of clients may access the same advertising system. Because the clients on the terminal are independent of each other, only a quantity of per-day display times of an advertisement on a single client on the terminal can be controlled by using the foregoing method, but a total quantity of display times of the same advertisement on the plurality of clients on the terminal cannot be controlled. For example, two clients Huawei music and Huawei video are installed on a mobile phone of a user, and a Huawei advertisement SDK is integrated into each of the two clients. With the foregoing method, only a maximum quantity of per-day display times of an advertisement on the client Huawei music and a maximum quantity of per-day display times of the advertisement on the client Huawei video can be controlled, but a total quantity of per-day display times of the advertisement on the clients Huawei music and Huawei video cannot be controlled.

In view of the foregoing problem, embodiments of this application provide an advertisement display control method, a terminal, and an advertisement server, to resolve the following problem: A target advertisement cannot be centrally controlled to be displayed on a plurality of clients on one terminal by using the existing advertisement display control method, and consequently the control manner is unitary and flexibility is low.

FIG. 1 is a schematic structural diagram of an advertisement display control system according to an embodiment of this application. As shown in FIG. 1, the advertisement display control system includes a terminal 11, an advertisement server 12, an advertiser portal 13, a database 14, and a memory 15.

Terminal 11: The terminal 11 is an electronic device on which a plurality of applications are installed, and each application is represented in a form of a client 110. An advertisement SDK is integrated into the client 110. Therefore, the client 110 may display and request an advertisement; and the terminal 11 may send an advertisement request to the advertisement server 12 and receive an advertisement response returned by the advertisement server 13.

Advertisement server 12: The advertisement server 12 is a server for managing and controlling advertisement information in an advertising system. The advertisement server 12 may be configured to: receive the advertisement request sent by the terminal, process a parameter in the advertisement request, obtain, through parsing, a device identifier, an advertisement slot identifier, and the like in the advertisement request, a device identifier, an advertisement slot identifier, and the like in the advertisement request and determine a matching advertisement.

In this embodiment of this application, the advertisement request may carry a material identifier list cached into a directory corresponding to the client. The advertisement server 12 obtains the material identifier list by parsing the advertisement request, queries real-time statistical data, stored in the memory, of an advertisement corresponding to each material identifier, and determines permission information that is used to instruct a client corresponding to the terminal 11 to display the advertisement. The permission information includes display frequency information and valid display time information.

Specifically, the advertisement server 12 queries the memory or the advertisement server for statistical data information based on the material identifier list that is obtained through parsing and that is cached into the directory corresponding to the client; and determines permission information of an advertisement corresponding to each material identifier in the material identifier list, based on a preset quantity of display times of the advertisement within a time period corresponding to time information and on all clients on the terminal corresponding to the device identifier. The permission information may include invalid permission and restricted permission. The advertisement server 11 returns the determined advertisement and the determined permission information as response information of the advertisement request to the terminal 11, and the terminal 11 distributes the response information to a corresponding client.

Further, the advertisement server 12 may further receive an advertisement display notification reported by the terminal 11, and updates, based on the advertisement display notification, statistical data information corresponding to a material identifier. Optionally, the advertisement server may further store updated statistical data information in the memory. The advertisement display notification carries the device identifier, an advertisement slot identifier, a material identifier of the target advertisement, and the like. In addition, the device identifier may be used to identify a terminal, the advertisement slot identifier may be used to associate the advertising system with the client on the terminal, and the material identifier may be associated to an advertisement task in the advertising system. Therefore, the advertisement server 11 may count a quantity of displayed times of an advertisement corresponding to a same material identifier on a plurality of clients on the same terminal. For example, a client A and a client B are installed on one mobile phone, the advertisement server may count a quantity of displayed times, on the client A and the client B of the mobile phone within a time period corresponding to time information, of an advertisement corresponding to a material identifier, and may also calculate a total quantity of displayed times, on the client A and the client B of the mobile phone within an entire delivery period, of the advertisement corresponding to the material identifier.

The advertiser portal 13 is an entrance from which an advertiser or an advertising agent logs in to the advertising system. The advertiser or the advertising agent creates an advertisement task in the advertising system by using the advertiser portal and uploads an advertisement material. Further, the advertising system generates an advertisement material identifier for the corresponding advertisement task based on the advertisement material. For example, the advertiser logs in to the advertising system by using a browser on a PC.

Database 14: After the advertisement task is created, corresponding advertisement information is stored into the database. The advertisement server 12 may read the advertisement information from the database 14.

Memory 15: The memory stores statistical data information of an advertisement corresponding to the advertisement material identifier, so that the advertisement server can query for the statistical data information in real time. The memory 15 may use an open-source database Redis or may use another cache form. A form of implementing the cache is not limited in the embodiments of this application.

The terminal in the embodiments of this application may be a wireless terminal such as a mobile phone or a tablet computer, may be a device with a wireless connection function such as a handheld device, an in-vehicle device, a wearable device, a computing device, or a TV box, or may be a device in various forms such as user equipment UE, a mobile station (Mobile Station, MS), or a terminal (terminal). A client with an advertisement display function or an advertisement SDK integrated into an application may be installed on the terminal. This is not limited in the embodiments of this application.

The advertisement server in the embodiments of this application may be any device with data processing and data receiving and sending functions. This is not limited in the embodiments of this application.

In the following, technical solutions of this application and how the foregoing technical problem is resolved by using the technical solutions of this application are described in detail by using specific embodiments. It should be noted that, the following several specific embodiments may be mutually combined, and same or similar concepts or processes may not be described in some embodiments.

In the embodiments of this application, "a plurality of" means two or more. "And/or" describes an association relationship of associated objects and represents that three relationships may exist. For example, A and/or B may represent the following three cases: Only A exists, both A and B exist, and only B exists. The character "/" generally indicates an "or" relationship between the associated objects before and after the character.

Figure 2:
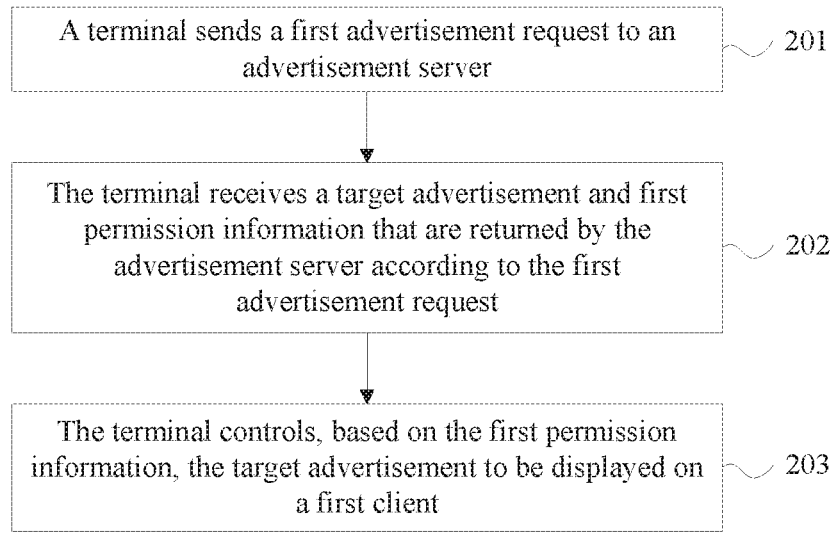
FIG. 2 is a schematic flowchart of an embodiment of an advertisement display control method according to embodiments of this application.

FIG. 2 is a schematic flowchart of an embodiment of an advertisement display control method according to embodiments of this application. In this embodiment of this application, a terminal is used as an execution entity, and the advertisement display control method provided in this embodiment of this application is described with reference to FIG. 1 and FIG. 2.

Step 201: The terminal sends a first advertisement request to an advertisement server.

In this embodiment of this application, the first advertisement request may include a device identifier of the terminal and an advertisement slot identifier of a first client on the terminal.

Optionally, the first advertisement request may further include a size of an advertisement slot, and/or position information of the terminal, and the like.

In this embodiment of this application, a first client corresponding to a first application and the first application is used for description. To be specific, the terminal starts the first client corresponding to the first application, and obtains an advertisement slot identifier of the first client, and then the terminal sends a first advertisement request to the advertisement server. The first advertisement request includes the device identifier of the terminal and the advertisement slot identifier of the first client.

In some embodiments of this application, if the advertisement server previously has sent an advertisement to the terminal, and the advertisement is cached into a directory corresponding to the first client, the first advertisement request may further include a material identifier list cached into the directory corresponding to the first client. Optionally, if no material identifier is cached into the directory corresponding to the first client, the material identifier list cached into the directory corresponding to the first client is an empty list.

It should be noted that, content specifically included in the first advertisement request may be determined depending on an actual requirement. This is not limited in this embodiment of this application.

In this embodiment of this application, the device identifier (any one of an IMEI, an Android ID, and a MAC address) of the terminal is used to identify the terminal. The device identifier of the terminal is irrelevant to a client on the terminal. When the same terminal requests advertisements for different clients, advertisement requests carry the same device identifier.

It should be noted that, in this embodiment of this application, the first client is any one of all clients that are on the terminal and into which advertisement SDKs are integrated. The first advertisement request is corresponding to the first client.

Optionally, if advertisement SDKs of an advertising system are integrated into a plurality of clients on the terminal, when applications corresponding to the plurality of clients installed on the terminal are started, the terminal obtains an advertisement slot identifier of each client and a material identifier list cached into a directory corresponding to each client, and sends an advertisement request to an advertisement server of the advertising system. For example, for a client A, the advertisement request includes the device identifier of the terminal, an advertisement slot identifier of the client A, and a material identifier list cached into a directory corresponding to the client A. Material identifiers in material identifier lists in different advertisement requests may be the same or different. The advertisement server determines, based on the device identifier carried in the advertisement request, the terminal that sends the advertisement request, and determines the corresponding client on the terminal based on the advertisement slot identifier.

For example, a client A and a client B are installed on a mobile phone. When both an application corresponding to the client A and an application corresponding to the client B are started, the mobile phone obtains the advertisement slot identifier of the client A and the material identifier list cached into the directory corresponding to the client A, and sends an advertisement request A to the advertisement server. In addition, the mobile phone also obtains an advertisement slot identifier of the client B and a material identifier list cached into a directory corresponding to the client B, and sends an advertisement request B to the advertisement server. The advertisement request A and the advertisement request B that are sent by the terminal carry a same device identifier, but carry different advertisement slot identifiers. The advertisement server can determine the corresponding terminal and the corresponding clients on the terminal by analyzing the device identifier and the advertisement slot identifiers in the advertisement requests.

In some embodiments of this application, an advertisement requested by the terminal for a client can be only displayed on the corresponding client. For example, an advertisement requested by the mobile phone for the client A is displayed on the client A, and an advertisement requested by the mobile phone for the client B is displayed on the client B. Material identifiers corresponding to the advertisements obtained by the client A and the client B may be the same or different. This is not limited in this embodiment of this application.

Optionally, the terminal may receive a plurality of target advertisements after sending the first advertisement request. The first client corresponding to the plurality of target advertisements received by the terminal may be displayed at different moments.

Optionally, the terminal may send an advertisement request to the advertisement server by using the Hypertext Transfer Protocol over Secure Sockets Layer (Hypertext Transfer Protocol over Secure Sockets Layer, https). A data parameter in the advertisement request may be in a JS object notation (JavaScript Object Notation, JSON) format. The JSON is a lightweight data exchange format, and is language independent.

Parameters mainly included in the advertisement request, types of the parameters, and description of the parameters are briefly described in the following. Table 1 lists parameters names of the parameters included in the advertisement request, the parameter types, and the parameter description. As listed in Table 1, in this embodiment of this application, a correspondence between the parameter names of the parameters possibly included in the advertisement request, the parameter types, and the description is listed in Table 1.

TABLE 1

Parameter names of parameters included in an advertisement request, parameter types, and parameter description

| Parameter name | Parameter type | Description |
| --- | --- | --- |
| slotID | String | Refers to an advertisement slot identifier, and is allocated by an advertising system. The advertisement slot identifier is obtained by a developer by applying to the advertising system in advance. When developing an application corresponding to a client, the developer integrates the advertisement slot identifier into the application, in an advertisement server, the advertisement slot identifier is associated with the client. |
| IMEI | String | IMEI number of a device |
| androidID | String | Android_id of an Android device |
| mac | String | MAC address of a terminal such as a mobile phone, a tablet computer, or a TV box. |
| cachedContentID | String[ ] | Refers to a material identifier list cached into a directory corresponding to a client, and may include a plurality of material identifiers. |
| appName | String | Refers to an application name, namely, a client, and an advertisement SDK is integrated into the application. |
| deviceType | Integer | Refers to a device type: 1: mobile phone, 2: tablet computer, and 3: set top box. |
| deviceOS | String | Operating system of the terminal, such as Android |
| networkType | Integer | Refers to a network connection type: 0: unknown; 1: WIFI; 2: 2G network; 3: 3G network; and 4: 4G network. |

Optionally, a packet data format in the advertisement request may be as follows:

```
{
"slotID":"fe3b0236496911",
"imei":"123456789012345",
"androidID":"60b2f89d4fa01620",
"mac":"59:2A:36:17:51:26",
"cachedContentID":[ "24829","724866","724951"],
"appName":"Huawei music"
"deviceType":1,
"deviceOS":"android",
"networkType":1
}
```

Step 202: The terminal receives a target advertisement and first permission information that are returned by the advertisement server according to the first advertisement request.

In some embodiments of this application, the first permission information is permission information that is determined by the advertisement server based on the device identifier and that is used to instruct the first client to display the target advertisement.

Specifically, the first permission information is determined by the advertisement server after the advertisement server queries the terminal for statistical information of the target advertisement based on the device identifier, and the statistical information includes advertisement display information of all clients on the terminal that display the target advertisement.

In this embodiment of this application, after receiving an advertisement response returned by the advertisement server, the terminal may obtain the target advertisement and the first permission information by parsing the advertisement response.

In some embodiments of this application, when the first advertisement request further includes the material identifier list cached into the directory corresponding to the first client, the first permission information further includes permission information that is determined by the advertisement server based on the device identifier and that is used to instruct the first client to display an advertisement corresponding to each material identifier in the material identifier list.

Optionally, the first permission information may include restricted permission and invalid permission depending on different display constraints of an advertisement. For example, the advertisement server performs statistics collection on advertisements whose quantity of displayed times within a preset time period corresponding to time information is greater than or equal to a preset quantity of display times but whose total quantity of displayed times within an advertisement delivery period does not reach a preset total quantity of display times, and determines permission information of these advertisements as the restricted permission. In addition, the advertisement server performs statistics collection on advertisements whose total quantity of displayed times within the advertisement delivery period exceeds the preset total quantity of display times, and determines permission information of these advertisements as the invalid permission.

In some embodiments of this application, the first permission information includes display frequency information and valid display time information. Specifically, the display frequency information may be a quantity of allowed display times of the target advertisement on the first client, and the valid display time information may be a time period in which the target advertisement is allowed to be displayed. The time period of allowed display may be measured in day, week, or month.

Step 203: The terminal controls, based on the first permission information, the target advertisement to be displayed on a first client.

Optionally, in some embodiments of this application, that the terminal controls, based on the target advertisement and the first permission information, the target advertisement to be displayed on the first client may be implemented in the following feasible implementation.

Specifically, that the advertisement on the terminal is displayed in an advertisement cache mode is described in this embodiment of this application. Therefore, when the terminal receives the target advertisement and the first permission information that are returned by the advertisement server, the terminal first determines permission information of the target advertisement based on the first permission information, that is, the display frequency information and the valid display time information of the target advertisement. When the target advertisement meets requirements both in the display frequency information and the valid display time information, the terminal may first cache the received target advertisement and the received the first permission information into the directory corresponding to the first client. Then, when an application corresponding to the first client is started, the terminal controls, based on the display frequency information, the first client to display the target advertisement within a time range corresponding to the valid display time information.

In other words, the terminal may first cache the requested target advertisement and the requested first permission information into the directory corresponding to the first client, so that when the application corresponding to the first client is started subsequently, the terminal can control, based on the first permission information, the first client to display the target advertisement within the time range corresponding to the valid display time information. This reduces a time for downloading and caching the target advertisement, and improves user experience.

Optionally, in some embodiments of this application, it can be learned from the foregoing analysis that the first permission information may include the restricted permission and the invalid permission.

If the permission information of the target advertisement or permission information of an advertisement corresponding to a material identifier cached into the directory corresponding to the first client is the restricted permission, that is, if a quantity of displayed times of the advertisement on all the clients on the terminal within the preset time period corresponding to the time information exceeds the preset quantity of display times but a total quantity of display times of the advertisement within the advertisement delivery period does not exceed the preset total quantity of display times, the terminal controls, in the following manner, the advertisement whose permission information is the restricted permission to be displayed on the first client.

The terminal caches the first permission information into the directory corresponding to the first client. When the application corresponding to the first client is started, the first client is prohibited, based on the restricted permission in the first permission information, from displaying, within the preset time period corresponding to the time information, the advertisement whose permission information is the restricted permission.

Optionally, in some embodiments of this application, if the permission information of the target advertisement or permission information of an advertisement corresponding to a material identifier cached into the directory corresponding to the first client is the invalid permission, that is, if a total quantity of displayed times of the advertisement on all the clients on the terminal within the advertisement delivery period reaches the preset total quantity of display times, the terminal processes the advertisement whose permission information is the invalid permission in the following manner.

The terminal removes an advertisement corresponding to the invalid permission from the directory corresponding to the first client, so that the advertisement corresponding to the invalid permission is no longer displayed on the first client on the terminal.

According to the advertisement display control method provided in this embodiment of this application, the terminal sends the first advertisement request to the advertisement server, where the first advertisement request includes the device identifier of the terminal and the advertisement slot identifier of the first client on the terminal; receives the target advertisement and the first permission information that are returned by the advertisement server according to the first advertisement request, where the first permission information is permission information that is determined by the advertisement server based on the device identifier and that is used to instruct the first client to display the target advertisement; and finally controls, based on the first permission information, the target advertisement to be displayed on the first client. In the technical solution, the terminal can control, based on the target advertisement and the first permission information that are returned by the advertisement server, the target advertisement to be displayed on a plurality of clients on the same terminal. The control manner is flexible and has high accuracy.

In some embodiments of this application, with reference to the foregoing embodiment, the advertisement display control method provided in this embodiment of this application may further include the following step:

after the terminal displays the target advertisement on the first client, the terminal reports an advertisement display notification to the advertisement server, so that the advertisement server updates statistical information of the target advertisement based on the advertisement display notification.

In this embodiment of this application, the advertisement display notification may include the device identifier of the terminal, the advertisement slot identifier of the first client, and a material identifier of the target advertisement.

It should be noted that, in this embodiment of this application, it is not limited that an advertisement displayed on the first client is the target advertisement. Actually, when an advertisement cached into the directory corresponding to the first client is displayed on the first client, the terminal is triggered to obtain the advertisement slot identifier of the first client and the material identifier of the target advertisement. The terminal reports the advertisement display notification to the advertisement server, so that the advertisement server updates real-time statistical data information of the target advertisement in a timely manner. Therefore, there may be no sequence order between this step and the steps in the embodiments shown in FIG. 2.

Specifically, when the advertisement cached into the directory corresponding to the first client or the target advertisement is displayed on the first client, it indicates that one advertisement impression event occurs on the first client. Therefore, the terminal is triggered to report the advertisement display notification to the advertisement server.

In this embodiment of this application, when the advertisement server receives the advertisement display notification reported by the terminal, to make the advertisement server determine that the advertisement display notification is sent by the terminal after which client on which terminal displays the advertisement, the advertisement display notification reported by the terminal needs to carry the device identifier of the terminal and the advertisement slot identifier of the first client on the terminal. To make the advertisement server update, in a timely manner, the statistical data information of the advertisement stored in the advertisement server or a memory, the advertisement display notification also needs to carry the material identifier of the target advertisement.

In some embodiments of this application, if two clients on the same terminal request a same target advertisement from the advertisement server of the advertising system, material identifiers are the same. Likewise, if two clients on the same terminal display a same advertisement, two advertisement display notifications reported by the terminal carry a same device identifier and a same material identifier.

Optionally, the https protocol may be also used for the advertisement display notification, and parameter data thereof may be in a JSON format. Table 2 lists parameter names of parameters included in the advertisement display notification, types of the parameters, and description of the parameters. As listed in Table 2, in this embodiment, a correspondence between the parameter names of the main parameters in the advertisement display notification, the parameter types, and the description is listed as follows.

TABLE 2

Parameter names of parameters included in an advertisement display notification, parameter types, and parameter description

| Parameter name | Parameter type | Description |
| --- | --- | --- |
| slotID | String | Refers to an advertisement slot identifier, and is allocated by an advertising system. The advertisement slot identifier is obtained by a developer by applying to the advertising system in advance. When developing an application corresponding to a client, the developer integrates the advertisement slot identifier into the application. In an |

TABLE 2-continued

Parameter names of parameters included in an advertisement display notification, parameter types, and parameter description

| Parameter name | Parameter type | Description |
| --- | --- | --- |
| | | advertisement server, the advertisement slot identifier is associated with the client. |
| IMEI | String | IMEI number of a device |
| androidID | String | Android_id of an Android device |
| mac | String | MAC address of a terminal such as a mobile phone, a tablet computer, or a TV box |
| eventType | String | Refers to an event type: "impression": display event; and "click": click event. |
| contentID | String | Refers to a material identifier. When an advertiser creates an advertisement task in the advertising system, the advertising system allocates an ID for an advertisement material in the advertisement task. The material identifier is in one-to-one correspondence with the advertisement task. The corresponding advertisement task may be determined based on the material identifier. |
| signature | String | This parameter is sent by the advertisement server to the terminal when the advertisement server responds to the advertisement request of the terminal, so that the terminal sends the parameter to the advertisement server when reporting the advertisement display notification, and the advertisement server performs checking. |

Optionally, a packet data format in the advertisement display notification may be as follows:

```
{
"slotID":"fe3b0236496911",
"imei":" 123456789012345",
"androidID":"60b2f89d4fa01620",
"mac":"59:2A:36:17:51:26",
"eventType":"impression",
"contentID":"123456",
"signature":"17babda658b3933afeacia77800aaf7dcbec449ca88ae5d9bfabb39bf0831706"
}
```

Further, in some embodiments of this application, the method further includes:

the terminal sends a second advertisement request to the advertisement server, so that the advertisement server determines, based on updated statistical information of the target advertisement, second permission information that is used to instruct a second client on the terminal to display the target advertisement.

In this embodiment of this application, the second advertisement request may include the device identifier of the terminal and an advertisement slot identifier of the second client on the terminal.

Specifically, the terminal may further send the second advertisement request to the advertisement server. To be specific, after the terminal requests the target advertisement for the first client, the terminal may further request the target advertisement for the second client. Before the terminal sends the second advertisement request to the advertisement server, the first client displays the target advertisement, and the terminal has reported the advertisement display notification to the advertisement server. During determining second permission information of the target advertisement by the advertisement server, the advertisement server determines the second permission information based on updated statistical information of the target advertisement. In this way, the terminal can effectively control the target advertisement to be displayed on different clients, thereby improving flexibility of advertisement display.

According to the advertisement display control method provided in this embodiment of this application, after the terminal displays the target advertisement on the first client, the terminal reports the advertisement display notification to the advertisement server, where the advertisement display notification includes the device identifier of the terminal, the advertisement slot identifier of the first client, and the material identifier of the target advertisement. In this way, the advertisement server can update the statistical data information of the target advertisement in a timely manner. Further, when the terminal sends the second advertisement request to the advertisement server, the advertisement server can determine, based on the updated statistical information of the target advertisement, the second permission information that is used to instruct the second client on the terminal to display the target advertisement. This ensures accuracy of the statistical information of the advertisement stored in the advertisement server.

Figure 3:
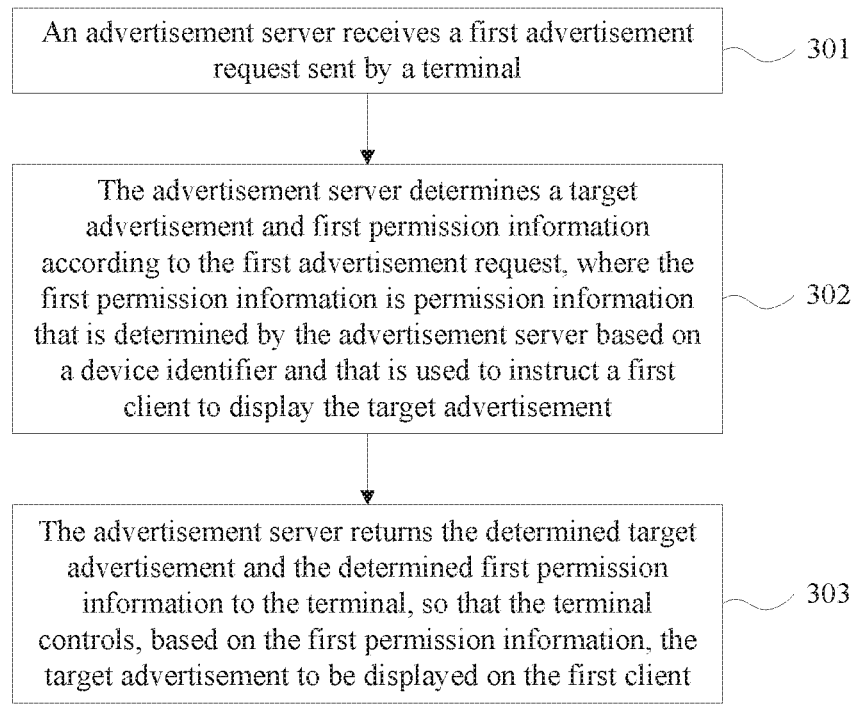
FIG. 3 is a schematic flowchart of another embodiment of an advertisement display control method according to embodiments of this application.

Optionally, FIG. 3 is a schematic flowchart of another embodiment of an advertisement display control method according to embodiments of this application. In this embodiment of this application, an advertisement server is used as an execution entity, and the advertisement display control method provided in this embodiment of this application is described with reference to FIG. 1, FIG. 2, and FIG. 3.

Step 301: The advertisement server receives a first advertisement request sent by a terminal.

In this embodiment of this application, the first advertisement request may include a device identifier of the terminal and an advertisement slot identifier of a first client on the terminal.

In this embodiment of this application, the advertisement server of an advertising system may receive advertisement requests sent by a plurality of terminals. To make the advertisement server identify sources of the advertisement requests, the first advertisement request received by the advertisement server needs to carry a device identifier of a terminal and an advertisement slot identifier of a first client on the terminal. Therefore, the advertisement server may determine, based on the device identifier and the advertisement slot identifier, the terminal corresponding to the first advertisement request and the first client on the terminal.

In addition, to make the advertisement server collect statistical information of each material identifier in a material identifier list cached into a directory corresponding to the first client, that is, collect a quantity of displayed times, on the first client on the terminal within a preset time period corresponding to time information, of an advertisement corresponding to each material identifier and a total quantity of displayed times, within an advertisement delivery period, of the advertisement corresponding to each material identifier, the first advertisement request may further include the material identifier list cached into the directory corresponding to the first client.

Step 302: The advertisement server determines a target advertisement and first permission information according to the first advertisement request, where the first permission information is permission information that is determined by the advertisement server based on the device identifier and that is used to instruct the first client to display the target advertisement.

After creating an advertisement task, an advertiser stores advertisement information corresponding to the advertisement task into a database. Optionally, the advertisement information includes content such as a size of the advertisement, a limited display time, and a download address for an image advertisement. It should be noted that, specific content of the advertisement information is not limited in this embodiment of this application, and the content may be determined according to an actual requirement.

In some embodiments of this application, the advertisement server may first parse the received first advertisement request to obtain the device identifier, the advertisement slot identifier, and the like in the first advertisement request, and then filter out an appropriate target advertisement based on the device identifier and the advertisement slot identifier.

In some embodiments of this application, to reduce load of the advertisement server, the target advertisement corresponding to the advertisement task may be stored into the database, so that the advertisement server may first obtain the device identifier and the advertisement slot identifier of the first client from the first advertisement request; query, based on the device identifier and the advertisement slot identifier in the first advertisement request, the database storing the target advertisement, to filter out the appropriate target advertisement from the database; and further determine the target advertisement matching the advertisement slot identifier. This can effectively reduce an information storage amount of the advertisement server, and increase a response speed of the advertisement server.

In some embodiments of this application, the first permission information includes display frequency information and valid display time information. The display frequency information may be a quantity of allowed display times of the target advertisement on the first client, and the valid display time information may be a time period in which the target advertisement is allowed to be displayed.

In some embodiments of this application, when the first advertisement request further includes the material identifier list cached into the directory corresponding to the first client, the first permission information further includes permission information that is determined by the advertisement server based on the device identifier and that is used to instruct the first client to display an advertisement corresponding to each material identifier in the material identifier list.

Specifically, when the advertisement server obtains, by parsing the first advertisement request, the material identifier list cached into the directory corresponding to the first client, the advertisement server may first query for the statistical information of the advertisement corresponding to each material identifier in the material identifier list, that is, the quantity of displayed times, within the preset time period corresponding to the time information, of the advertisement corresponding to the material identifier and the total quantity of displayed times, within the advertisement delivery period, of the advertisement corresponding to each material identifier; and respectively compare the quantity of displayed times and the total quantity of displayed times with a preset quantity of display times, within the preset time period corresponding to the time information, of the advertisement corresponding to the material identifier and a preset total quantity of display times, within the advertisement delivery period, of the advertisement corresponding to each material identifier, to determine permission information of the advertisement corresponding to each material identifier.

It should be noted that, for specific description about how the advertisement server determines the permission information of the advertisement corresponding to each material identifier, refer to embodiments shown in FIG. 4 to FIG. 6 in the following. Details are not described herein.

Optionally, the statistical information of the advertisement may be stored in a memory. When the terminal sends the first advertisement request to the advertisement server, after the advertisement server obtains, by parsing the first advertisement request, the material identifier list cached into the directory corresponding to the first client, the advertisement server may determine, by querying the memory, the statistical information of the advertisement corresponding to each material identifier in the material identifier list, determine permission information of an advertisement whose quantity of displayed times on all clients on the terminal within the preset time period corresponding to the time information is greater than or equal to a preset quantity of display times but whose total quantity of display times within the advertisement delivery period does not exceed the preset total quantity of display times, as restricted permission, and determine permission information of an advertisement whose total quantity of displayed times on all the clients on the terminal within the advertisement delivery period is greater than or equal to a preset total quantity of display times, as the invalid permission.

In this embodiment of this application, when the statistical information of the advertisement is stored in the advertisement server, the advertisement server may further query the advertisement server based on the device identifier and the material identifier list cached into the directory corresponding to the first client that are carried in the first advertisement request, to determine the permission information of the advertisement.

The advertisement server may include a plurality of different modules. For example, an advertisement request parameter processing module of the advertisement server parses the received first advertisement request to obtain a parameter, and transfers the parameter obtained through parsing to an advertisement selection module and a display frequency control module for further processing. The advertisement selection module filters out the target advertisement based on the device identifier and the advertisement slot identifier that are obtained through parsing. The display frequency control module in the advertisement server queries the memory for the statistical information by using the device identifier and the material identifier list cached into the directory corresponding to the first client that are obtained through parsing by the advertisement request parameter processing module, to determine the permission information of the advertisement.

The advertisement server may preferentially use an IMEI as the device identifier. If the advertisement request does not carry the IMEI, the advertisement server uses an androidID as the device identifier. If the advertisement request does not carry the androidID, the advertisement server uses a MAC address as the device identifier.

Step 303: The advertisement server returns the determined target advertisement and the determined first permission information to the terminal, so that the terminal controls, based on the first permission information, the target advertisement to be displayed on the first client.

In some embodiments of this application, the advertisement server includes an advertisement response processing module. The advertisement response processing module generates an advertisement response by combining the determined target advertisement and the determined first permission information, and sends the determined target advertisement and the determined first permission information in a form of the advertisement response to the terminal. Optionally, the first permission information may include restricted permission and invalid permission.

For example, the first permission information includes a given-day-restrictively-displayed material identifier and an invalid material identifier. Optionally, Table 3 lists parameter names of parameters included in the advertisement response, types of the parameters, and description of the parameters. In this embodiment of this application, it is not limited that the advertisement response includes parameters listed in Table 3, and the advertisement response may further another parameter. This is not described herein. As listed in Table 3, in this embodiment of this application, a correspondence between the parameter names of the main parameters in the advertisement response, the parameter types, and the description is listed as follows:

TABLE 3

Parameters names of parameters included in an advertisement response, parameter types, and parameter description

| Parameter name | Parameter type | Description |
| --- | --- | --- |
| retcode | Integer | Refers to a return value, used to notify the terminal whether an advertisement is returned normally or there is an error code. |
| slotID | String | Refers to an advertisement slot identifier, and is allocated by an advertising system. The advertisement slot identifier is obtained by a developer by applying to the advertising system in advance. When developing an application corresponding to a client, the developer integrates the advertisement slot identifier into the application. In an advertisement server, the advertisement slot identifier is associated with the client. |
| contentID | String | Refers to a material identifier. When an advertiser creates an advertisement task in the advertising system, the advertising system allocates an ID for an advertisement material in the advertisement task. The material identifier is in one-to-one correspondence with the advertisement task. The corresponding advertisement task may be determined based on the material identifier. |
| imageUrl | String | Refers to a download address for an image |

TABLE 3-continued

Parameters names of parameters included in an advertisement response, parameter types, and parameter description

| Parameter name | Parameter type | Description |
| --- | --- | --- |
| signature | String | corresponding to the target advertisement. This parameter is sent by the advertisement server to the terminal when the advertisement server responds to the advertisement request of the terminal, so that the terminal sends the parameter to the advertisement server when reporting the advertisement display notification, and the advertisement server performs checking. |
| todayNoShowContentID | String[ ] | Given-day-restrictively-displayed material identifier |
| invalidContentID | String[ ] | Invalid material identifier |

Optionally, a packet data format in the advertisement response may be as follows:
{
"retcode":200,
"slotID":"fe3b0236496911",
"contentID":"88956",
"imageUrl":"http://www.vmall.com/ 0457cf728e1e105e3d9a9fa163efe2db3.jpg",
"signature":"17babda658b3933afeac1a77800aaf7dcbec449ca88ae5d9bfabb39bf0831706",
"todayNoShowContentID":[ "24829","24866"],
"invalidContentID":["248333","56775","12569"]
}

According to the advertisement display control method provided in this embodiment of this application, the advertisement server receives the first advertisement request sent by the terminal, where the first advertisement request includes the device identifier of the terminal and the advertisement slot identifier of the first client on the terminal; determines the target advertisement and the first permission information according to the first advertisement request, and returns the determined target advertisement and the determined first permission information to the terminal, so that the terminal controls, based on the first permission information, the target advertisement to be displayed on the first client. The first permission information is permission information that is determined by the advertisement server based on the device identifier and that is used to instruct the first client to display the target advertisement. In the technical solution, the advertisement server may calculate a display frequency of the target advertisement on all the clients on the same: terminal, and returns the first permission information to the terminal, so that the terminal performs accurate control. The control manner is flexible and has high accuracy.

Figure 4:
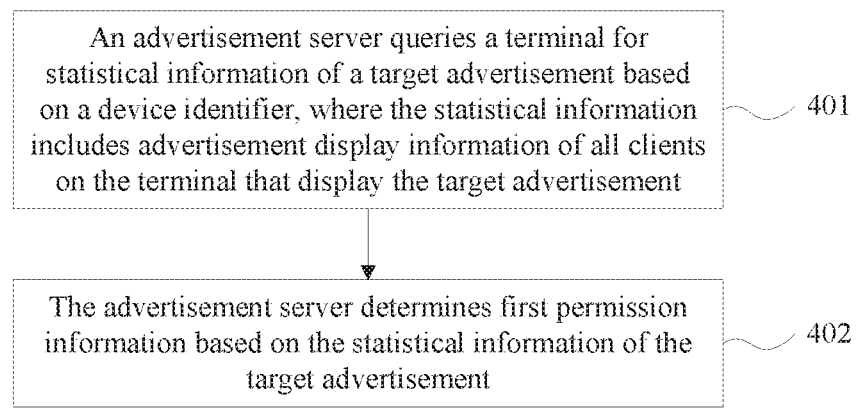
FIG. 4 is a schematic flowchart of still another embodiment of an advertisement display control method according to embodiments of this application.

Optionally, in the foregoing embodiment, FIG. 4 is a schematic flowchart of a still another embodiment of an advertisement display control method according to embodiments of this application. With reference to FIG. 3 and FIG. 4, step 302 in which the advertisement server determines the first permission information according to the first advertisement request may specifically include the following steps.

Step 401: The advertisement server queries the terminal for statistical information of the target advertisement based on the device identifier, where the statistical information includes advertisement display information of all clients on the terminal that display the target advertisement.

Step 402: The advertisement server determines the first permission information based on the statistical information of the target advertisement.

Specifically, the advertisement server queries, based on the obtained device identifier, the memory for the statistical information of the target advertisement on the terminal, to determine a quantity of displayed times of the target advertisement on all clients on the terminal within a preset time period corresponding to time information and a total quantity of displayed times of the target advertisement within an advertisement delivery period, and further to determine the first permission information of the target advertisement based on the determined quantity of displayed times and the determined total quantity of displayed times within the advertisement delivery period. The first permission information includes restricted permission and invalid permission.

Figure 5:
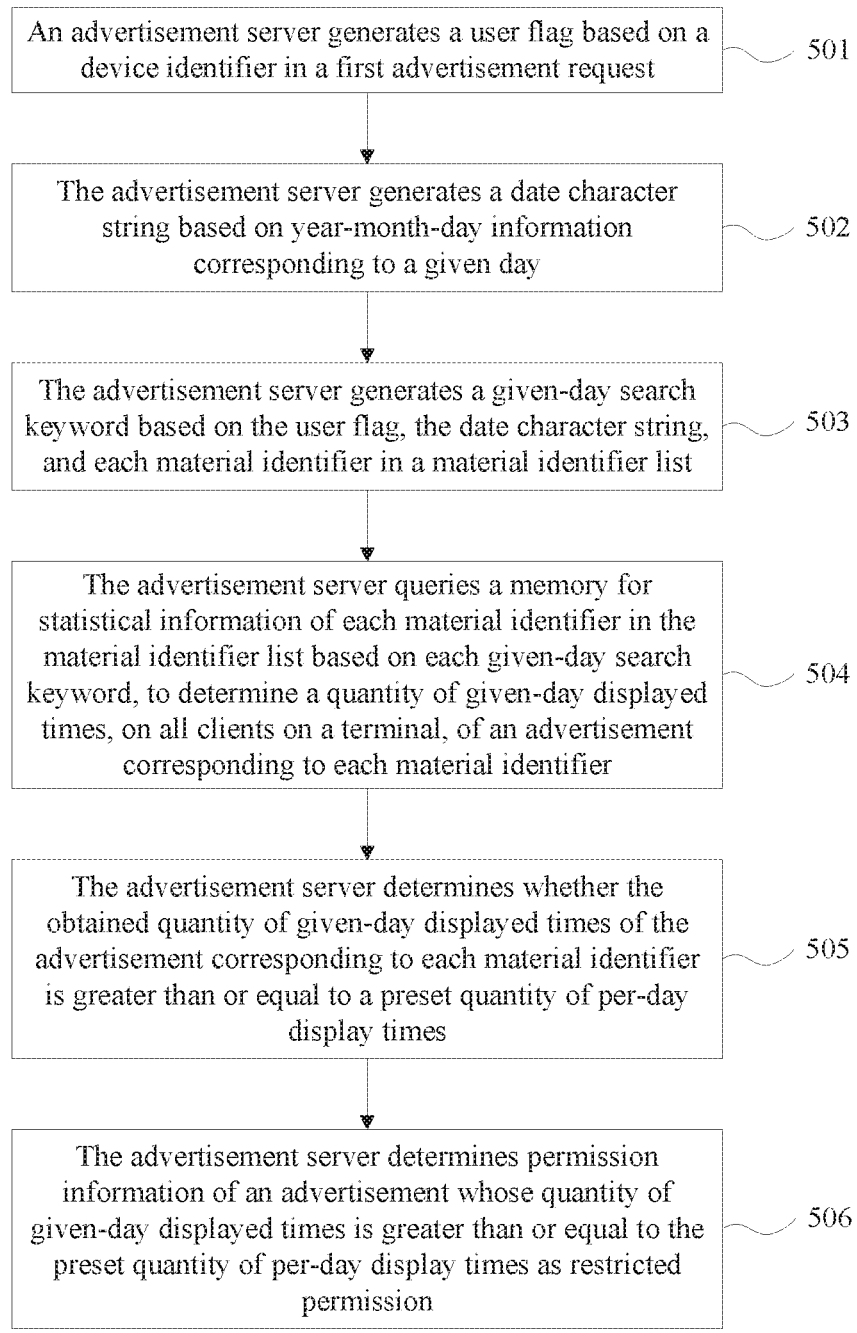
FIG. 5 is a schematic flowchart of yet another embodiment of an advertisement display control method according to embodiments of this application.
Figure 6:
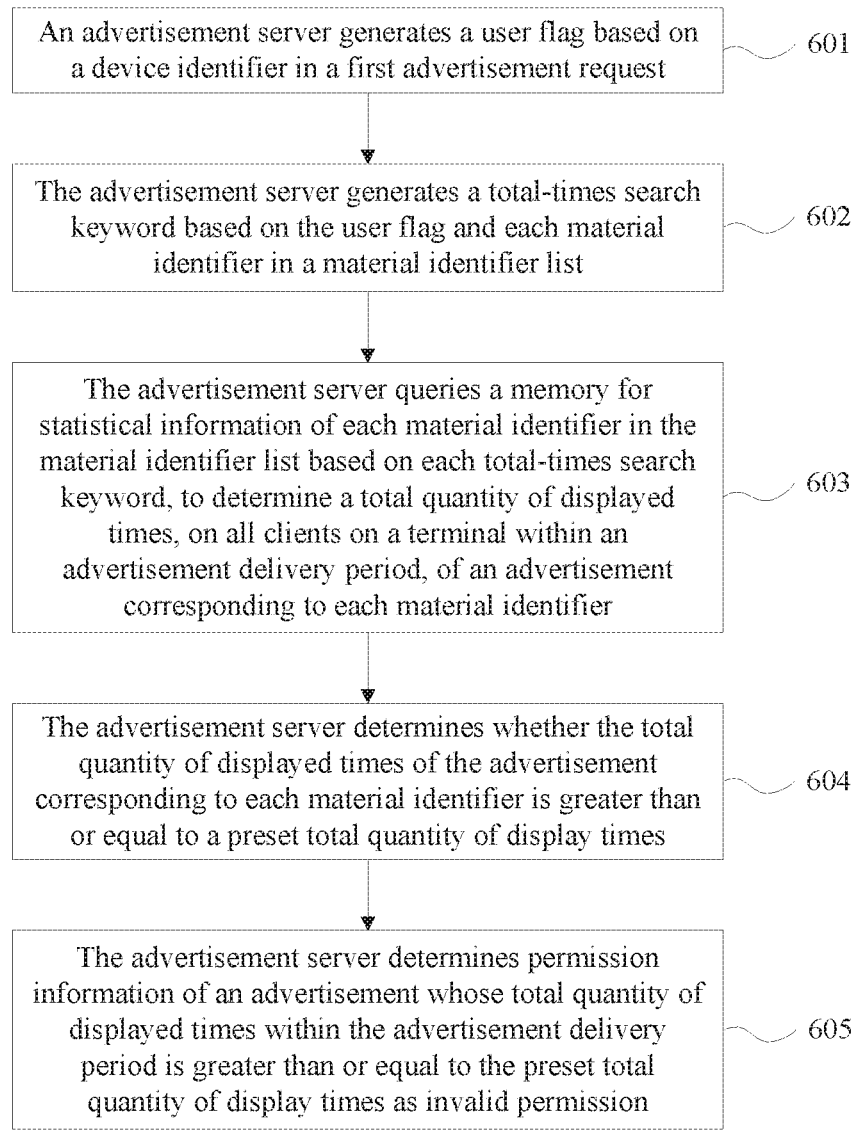
FIG. 6 is a schematic flowchart of still yet another embodiment of an advertisement display control method according to embodiments of this application.

In some embodiments of this application, when the first advertisement request received by the advertisement server further includes the material identifier list cached into the directory corresponding to the first client, determining the restricted permission and the invalid permission is described in detail by using embodiments shown in FIG. 5 and FIG. 6. FIG. 5 is a schematic flowchart of still another embodiment of an advertisement display control method according to embodiments of this application. FIG. 6 is a schematic flowchart of yet another embodiment of an advertisement display control method according to embodiments of this application.

Optionally, as shown in FIG. 5, that restricted permission is determined by analyzing statistical information of an advertisement corresponding to each material identifier in a material identifier list cached into a directory corresponding to a first client, and that a preset time period corresponding to time information is one day are mainly used for brief description in FIG. 5. According to the advertisement display control method provided in this embodiment of this application, step 302 in which the advertisement server determines the first permission information according to the first advertisement request may further include the following steps.

Step 501: The advertisement server generates a user flag based on the device identifier in the first advertisement request.

Specifically, the advertisement server obtains the device identifier by parsing the first advertisement request, and generates the user flag userFlag by using the device identifier. The user flag userFlag is used to identify a terminal.

Step 502: The advertisement server generates a date character string based on year-month-day information corresponding to a given day.

To determine given-day-displayed information of an advertisement corresponding to each material identifier in the material identifier list, cached into the directory corresponding to the first client, in the first advertisement request, the advertisement server first generates the date character string yyyyMMdd including the year-month-date information based on the year-month-date information corresponding to the given day. For example, the given day is Dec. 20, 2016, the generated date character string yyyyMMdd is 20161220.

Step 503: The advertisement server generates a given-day search keyword based on the user flag, the date character string, and each material identifier in the material identifier list.

A format of given-day search keyword is consistent with a format of a statistical-information keyword in a memory.

Optionally, when the advertisement server determines, based on the material identifier, statistical information of the advertisement corresponding to each material identifier, the advertisement server needs to query the memory storing the statistical information of the advertisement. Therefore, the advertisement server first needs to generate the given-day search keyword based on the generated user flag userFlag, the generated date character string yyyyMMdd, and each material identifier contentID. A format of all given-day search keywords is userFlag_contentID_yyyyMMdd, and the format needs to be the same as a format of the statistical-information keyword stored in the memory by the advertisement server. Optionally, a quantity of given-day search keywords generated by the advertisement server is the same as a quantity of material identifiers in the material identifier list in the first advertisement request.

Step 504: The advertisement server queries a memory for statistical information of each material identifier in the material identifier list based on each given-day search keyword, to determine a quantity of given-day displayed times, on all clients on the terminal, of an advertisement corresponding to each material identifier.

After generating the given-day search keyword according to the first advertisement request, the advertisement server queries the memory for the statistical information of each material identifier, to determine the quantity of given-day displayed times, on all the clients on the terminal, of the advertisement corresponding to each material identifier.

In some embodiments of this application, when a plurality of given-day search keywords are generated, the advertisement server needs to query the memory based on each of the given-day search keywords, and further determines, based on all query results, permission information of the advertisement corresponding to each material identifier.

Specifically, for a plurality of advertisement requests received from a same terminal on a same day, userFlags and date character strings that are generated by the advertisement server are separately the same. If different advertisement requests carry a same material identifier, it indicates that the quantity of given-day displayed times, counted by the advertisement server, of the advertisement corresponding to each material identifier is a total quantity of given-day display times of the advertisement on the plurality of clients.

Step 505: The advertisement server determines whether the obtained quantity of given-day displayed times of the advertisement corresponding to each material identifier is greater than or equal to a preset quantity of per-day display times.

In this embodiment of this application, after obtaining the quantity of given-day displayed times of the advertisement corresponding to each material identifier, the advertisement server compares the quantity of given-day displayed times with the preset quantity of per-day display times that is set in the advertisement server, and determines, based on a relationship between the quantity of given-day displayed times of the advertisement corresponding to each material identifier and the preset quantity of per-day display times, permission information of the advertisement corresponding to each material identifier.

For example, if the quantity of given-day displayed times is less than the preset quantity of per-day display times, it indicates that a quantity of given-day displayed times of the advertisement corresponding to the material identifier on the terminal does not reach an upper limit. However, display frequency information of each advertisement may be determined in this case.

Step 506: The advertisement server determines permission information of an advertisement whose quantity of given-day displayed times is greater than or equal to the preset quantity of per-day display times as restricted permission.

For another example, if the quantity of given-day displayed times is greater than or equal to the preset quantity of per-day display times, it indicates that a quantity of given-day displayed times of the advertisement corresponding to the material identifier on the terminal reaches an upper limit. Therefore, the permission information of the advertisement is determined as restricted permission. The restricted permission includes display frequency information and valid display time information, and is sent to the terminal in a form of an advertisement response finally, so that when an application corresponding to the first client on the terminal is started, the advertisement whose permission information is the restrictive information is prohibited, based on the restricted permission in the first permission information, from being displayed on the first client within the preset time period corresponding to the time information.

According to the advertisement display control method provided in this embodiment of this application, the advertisement server generates the user flag based on the device identifier in the first advertisement request; generates the date character string based on the year-month-day information corresponding to the given day; generates the given-day search keyword based on the user flag, the date character string, and each material identifier in the material identifier list; queries the memory for the statistical information of each material identifier in the material identifier list based on each given-day search keyword, to determine the quantity of given-day displayed times of the advertisement corresponding to each material identifier; and determines the permission information of the advertisement whose quantity of given-day displayed times is greater than or equal to the preset quantity of per-day display times as the restricted permission. According to the technical solution, an advertisement whose permission information is restricted permission can be determined, thereby providing a premise for the terminal to control the advertisement to be displayed on different clients.

Optionally, as shown in FIG. 6, that invalid permission is determined by analyzing statistical information of an advertisement corresponding to each material identifier in a material identifier list cached into a directory corresponding to a first client is used for description in FIG. 6. According to the advertisement display control method provided in this embodiment, step 302 in which the advertisement server determines the first permission information according to the first advertisement request may further include the following steps.

Step 601: The advertisement server generates a user flag based on a device identifier in the first advertisement request.

An implementation of this step is consistent with the implementation of step 501 in the embodiment shown in FIG. 5, and details are not described herein again.

Step 602: The advertisement server generates a total-times search keyword based on the user flag and each material identifier in the material identifier list.

A format of the total-times search keyword is consistent with a format of a statistical-information keyword in a memory.

In this embodiment of this application, when determining the statistical information of the advertisement corresponding to each material identifier in the material identifier list, the advertisement server also needs to generate a series of total-times search keywords to be queried in the memory. Specifically, the advertisement server generates the total-times search keyword with reference to the generated user flag userFlag and each material identifier contentedID in the material identifier list. A format of each total-times search keyword is userFlag_contentID, and the format is the same as the format of the statistical-information keyword stored in the memory by the advertisement server. Optionally, there may be a plurality of material identifiers in the material identifier list. Correspondingly, the advertisement server may generate a plurality of total-times search keywords.

Step 603: The advertisement server queries a memory for statistical information of each material identifier in the material identifier list based on each total-times search keyword, to determine a total quantity of displayed times, on all clients on the terminal within an advertisement delivery period, of the advertisement corresponding to each material identifier.

After generating the total-times search keyword according to the first advertisement request, the advertisement server queries the memory for the statistical information of each material identifier, to determine the total quantity of displayed times, on all the clients on the terminal within the advertisement delivery period, of an advertisement corresponding to each material identifier.

Optionally, when the advertisement server receives a plurality of advertisement requests sent by the same terminal, the advertisement server generates a same userFlag. If the advertisement requests carry a same material identifier, the total quantity of displayed times, within the advertisement delivery period and counted by the advertisement server, of the advertisement corresponding to the material identifier is a total quantity of display times of the advertisement on all the clients on the terminal within the advertisement delivery period.

Step 604: The advertisement server determines whether the total quantity of displayed times of the advertisement corresponding to each material identifier is greater than or equal to a preset total quantity of display times.

In this embodiment of this application, after obtaining the total quantity of displayed times of the advertisement corresponding to each material identifier, the advertisement server compares the total quantity of displayed times with the preset total quantity of display times that is within the advertisement delivery period and that is stored in the advertisement server, and determines, based on a relationship between the total quantity of displayed times of the advertisement corresponding to each material identifier and the preset total quantity of display times, permission information of the advertisement corresponding to each material identifier.

For example, if the total quantity of displayed times is less than the preset total quantity of display times, it indicates that a total quantity of display times, within the advertisement delivery period, of the advertisement corresponding to the material identifier does not reach an upper limit. Therefore, the advertisement server may further perform processing based on a quantity of displayed times, within a preset time period corresponding to time information, of the advertisement corresponding to the material identifier. For a specific step for further processing, refer to the embodiment shown in FIG. 5. Details are not described herein again.

Step 605: The advertisement server determines permission information of an advertisement whose total quantity of displayed times within the advertisement delivery period is greater than or equal to the preset total quantity of display times as invalid permission.

For another example, if the total quantity of displayed times is greater than or equal to the preset total quantity of display times, it indicates that a total quantity of display times of the advertisement within the advertisement delivery period reaches an upper limit. Therefore, the advertisement server may determine the permission information of the advertisement as invalid permission, and finally sends the permission information to the terminal in a form of an advertisement response, so that the terminal removes the advertisement whose permission information stored into the directory corresponding to the first client is the invalid permission.

According to the advertisement display control method provided in this embodiment of this application, the advertisement server generates the user flag based on the device identifier in the first advertisement request; generates the total-times search keyword based on the user flag and each material identifier in the material identifier list; queries the memory for the statistical information of each material identifier in the material identifier list based on each total-times search keyword; determines the total quantity of displayed times, within the advertisement delivery period, of the advertisement corresponding to each material identifier; and determines the permission information of the advertisement whose total quantity of displayed times within the advertisement delivery period is greater than or equal to the preset total quantity of display times as the invalid permission. According to the technical solution, an advertisement whose permission information is restricted permission can be determined, thereby providing a premise for the terminal to control the advertisement to be displayed on different clients. The advertisement server can determine an advertisement whose permission information is the invalid permission, thereby providing a premise for the terminal to control the advertisement to be displayed on the different clients.

Figure 7:
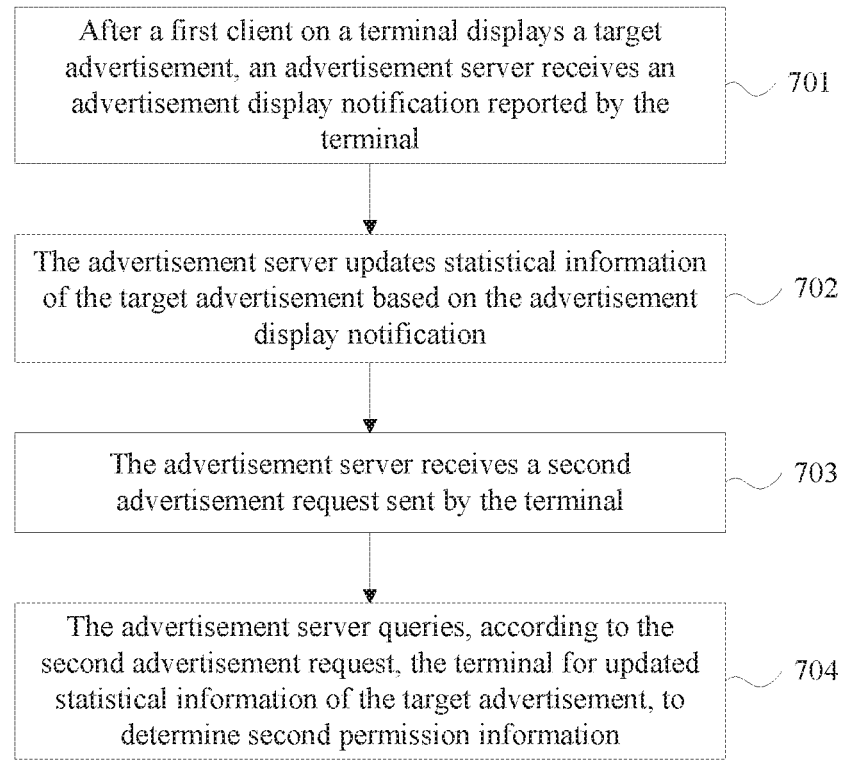
FIG. 7 is a schematic flowchart of a further embodiment of an advertisement display control method according to embodiments of this application.

Based on the foregoing embodiment, FIG. 7 is a schematic flowchart of yet another embodiment of an advertisement display control method according to embodiments of this application. In this embodiment of this application, that an advertisement server is also used as an execution entity is used for description. As shown in FIG. 7, the advertisement display control method provided in this embodiment further includes the following steps.

Step 701: After the first client on the terminal displays a target advertisement, the advertisement server receives an advertisement display notification reported by the terminal.

In some embodiments of this application, the advertisement display notification may include a device identifier of the terminal, an advertisement slot identifier of the first client, and a material identifier of the target advertisement.

In this embodiment of this application, if the first client on the terminal displays the target advertisement, the terminal obtains the advertisement slot identifier of the client and the material identifier of the target advertisement, and reports the advertisement display notification to the advertisement server.

Optionally, an advertisement event processing module in the advertisement server is configured to: receive the advertisement display notification reported by the terminal, obtain the material identifier of the target advertisement by parsing the advertisement display notification, update statistical information of the target advertisement, and store an update result in the memory.

Optionally, when the target advertisement is displayed, if a user clicks the target advertisement, that is, an advertisement click event occurs on the terminal, the terminal reports an advertisement click notification to the advertisement server. Correspondingly, the advertisement server receives the advertisement click notification, and further counts advertisement click events.

For example, the memory may use Redis (Redis is an open-source high-performance key-value database) or use another form for caching.

That the memory uses Redis is used for description in the following. Table 4 lists a correspondence of an in-memory data structure being a key-value format. Data, keys, and value types are specifically listed in Table 4.

TABLE 4

Correspondence of an in-memory data structure being a key-value format

| Data name | Key | Value type |
| --- | --- | --- |
| Quantity of given-day displayed times, on a terminal, of an advertisement corresponding to a material identifier | userFlag_contentID_yyyyMMdd, where userFlag represents a device identifier, and userFlag represents a flag having undergone anonymization processing by using an SHA256 (a hash value is 256 bits) algorithm or an MD5 (message digest algorithm 5) algorithm; contentID represents the material identifier included in an advertisement request; and yyyyMMdd represents a date of a given day, for example, 20161220. | Is a string, for example, 2. |
| Total quantity of display times, on all terminals on the terminal within an advertisement delivery period, of an advertisement corresponding to the material identifier | userFlag_contentID, where userFlag represents the device identifier, and userFlag is a flag having undergone anonymization processing by using the SHA256 algorithm or the MD5 algorithm; and contentID represents the material identifier in an advertisement display notification. | Is a string, for example, 10. |

Step 702: The advertisement server updates statistical information of the target advertisement based on the advertisement display notification.

Optionally, the advertisement server obtains, by parsing the received advertisement display notification, the device identifier, the advertisement slot identifier, and the material identifier of the target advertisement that are included in the advertisement display notification. Therefore, the advertisement server may update, based on the device identifier and the material identifier of the target advertisement, a quantity of displayed times of the target advertisement on the terminal within a preset time period corresponding to time information and a total quantity of displayed times of the target advertisement within the advertisement delivery period.

For example, two clients a client A and a client B are installed on one mobile phone, and the two clients each display an advertisement corresponding to a same material identifier, and each report an advertisement display notification. Therefore, the advertisement server may update, based on the advertisement display notifications reported by the client A and the client B, a quantity of displayed times of the target advertisement within a preset time period corresponding to time information and a total quantity of displayed times of the target advertisement within an advertisement delivery period that are in the advertisement server or the memory, to ensure accuracy of statistical information, obtained by the advertisement server by querying the memory, of the material identifier.

In some embodiments of this application, as shown in FIG. 7, the method further includes the following steps.

Step 703: The advertisement server receives a second advertisement request sent by the terminal.

In some embodiments of this application, the second advertisement request includes the device identifier of the terminal and an advertisement slot identifier of a second client on the terminal.

Optionally, after receiving the first advertisement request that is sent by the terminal for the first client, the advertisement server may further receive the second advertisement request that is sent by the terminal for the second client. In other words, the advertisement server receives advertisement requests that are sent by the same terminal for different clients.

Step 704: The advertisement server queries, according to the second advertisement request, the terminal for updated statistical information of the target advertisement, to determine second permission information.

The second permission information is used to instruct the terminal to control the target advertisement to be displayed on the second client.

After the first client displays the target advertisement, the advertisement server receives the advertisement display notification. Therefore, after the advertisement server receives the second advertisement request sent by the second client, the advertisement server determines, based on the updated statistical information of the target advertisement, the second permission information that is used to instruct the second client to display the target advertisement, and further sends the second permission information to the terminal, so that the terminal controls, based on the second permission information, the target advertisement to be displayed on the second client.

According to the advertisement display control method provided in this embodiment of this application, after the first client on the terminal displays the target advertisement, the advertisement server may receive the advertisement display notification reported by the terminal, and update the statistical information of the target advertisement based on the advertisement display notification, so that when receiving the second advertisement request sent by the terminal for the second client, the advertisement server may query, according to the second advertisement request, the terminal for the updated statistical information of the target advertisement, to determine the second permission information. In the technical solution, the terminal interacts with the advertisement server in real time. This can ensure accuracy of the statistical information of the advertisement stored in the advertisement server, and improve user experience.

Figure 8:
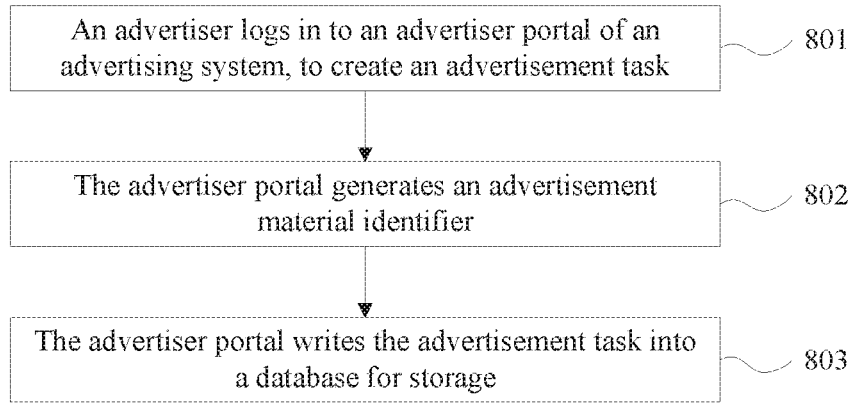
FIG. 8 is a schematic flowchart of creating an advertisement task in an advertisement display control method according to an embodiment of this application.
Figures 9, 10:
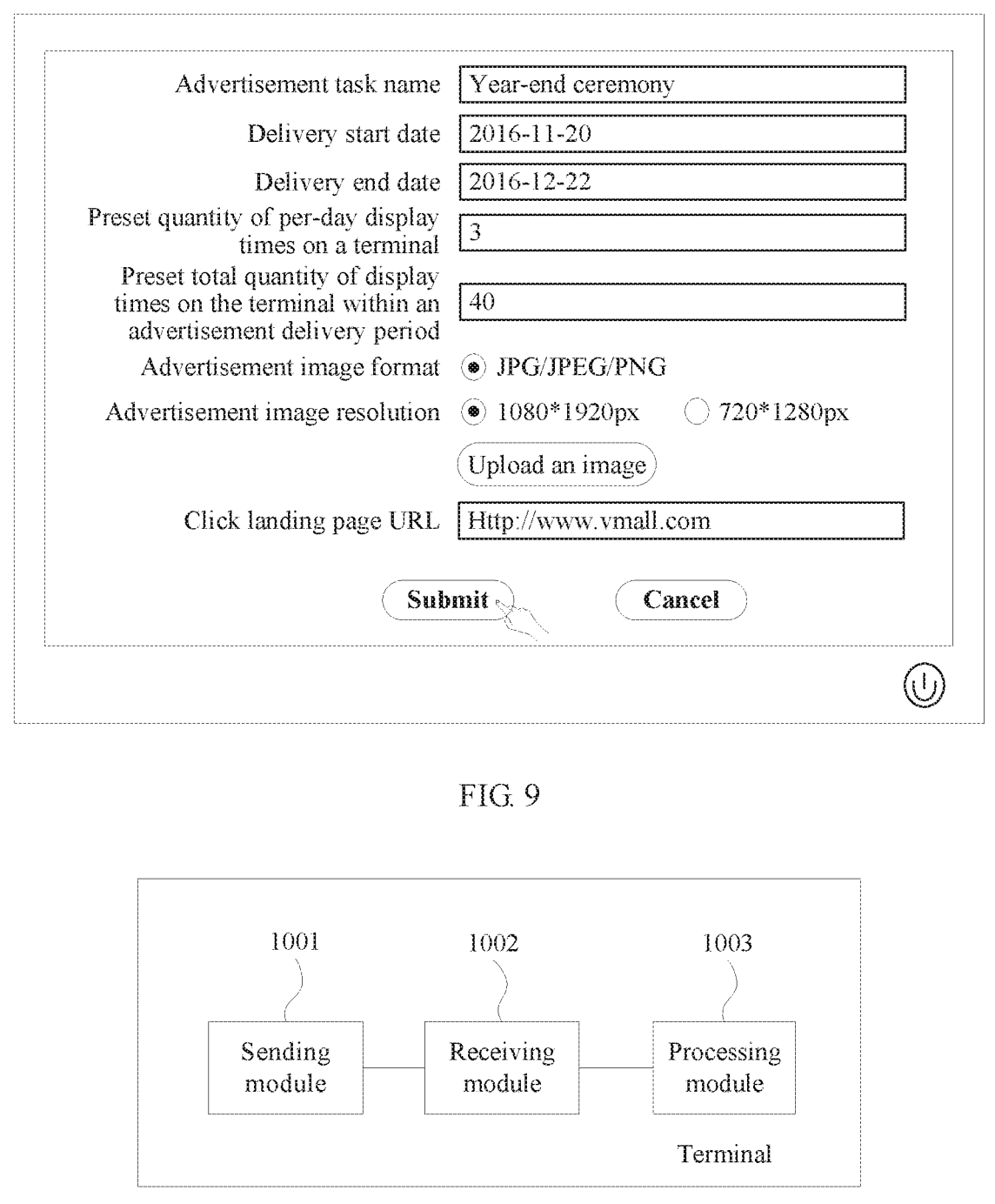

Further, a procedure for creating an advertisement task is briefly described in the following embodiment. FIG. 8 is a schematic flowchart of creating an advertisement task in an advertisement display control method according to an embodiment of this application. FIG. 9 is a schematic diagram of an interface for setting an advertisement task. In this embodiment of this application, an example in which an advertiser (or an advertising agent) creates an advertisement task in an advertising system, and stores the created advertisement task into a database is used for description. As shown in FIG. 8, in the advertisement display control method provided in this embodiment of this application, the method includes the following steps.

Step 801: An advertiser logs in to an advertiser portal of an advertising system, to create an advertisement task.

Specifically, information about the advertisement task may include an advertisement task name, a delivery start date, a delivery end date, a preset quantity of per-day display times on a terminal, a preset total quantity of display times on all clients on the terminal within an advertisement delivery period, and the like. It should be noted that, the information about the advertisement task includes but is not limited to the foregoing information, and may further include other information, such as a size of an advertisement image and resolution. The information about the advertisement task is not limited in this embodiment of this application.

For example, as shown in FIG. 9, in a creation interface of the advertisement task, the advertiser first enters "year-end ceremony" at a location corresponding to the advertisement task name, enters "2016-11-20" at a location corresponding to the delivery start date, enters "2016-12-22" at a location corresponding to the delivery end date, enters "3" at a location corresponding to the preset quantity of per-day display times on the terminal, and enters "40" at a location corresponding to the preset total quantity of display times on the terminal within the advertisement delivery period. In addition, the advertiser selects an advertisement image format "JPG/JPEG/PNG", and selects an advertisement image resolution "1080*1920px". Then, the advertiser uploads the advertisement image, enters a click landing page URL, and finally clicks "submit". In this way, creating of the advertisement task is completed.

Step 802: The advertiser portal generates an advertisement material identifier.

Optionally, the advertisement material identifier is in one-to-one correspondence with the advertisement task.

Step 803: The advertiser portal writes the advertisement task into a database for storage.

When the advertisement task is stored into the database, according to an advertisement request, an advertisement server may subsequently perform filtering and download an appropriate target advertisement.

Optionally, the advertisement task may be directly stored in the advertisement server. In this way, after the advertisement server receives the advertisement request, an appropriate target advertisement may be determined by querying the advertisement server.

Optionally, Table 5 lists a structure of a database storing an advertisement task. As listed in Table 5, the structure of the database may be as follows.

TABLE 5

Structure of a database storing an advertisement task

| Field name | Data type | Note |
| --- | --- | --- |
| id | AUTO_INCREMENT | Index, unique |
| task_name | VARCHAR | Advertisement task name |
| start_date | DATE | Delivery start date |
| end_date | DATE | Delivery end date |
| day_fc | INT | Preset quantity of per-day display times on a terminal |
| total_fc | INT | Preset total quantity of display times on all clients on the terminal within an advertisement delivery period |
| width | INT | Image width in unit of pixel |
| height | INT | Image height in unit of pixel |
| content_id | INT | Advertisement material identifier |
| image_url | VARCHAR | Download address for an advertisement image |
| click_url | VARCHAR | Click a landing page URL |
| created_time | DATETIME | Creation time |
| created_by | VARCHAR | Creator account |

According to the advertisement display control method provided in this embodiment of this application, the advertiser logs in to the advertiser portal of the advertising system, to create the advertisement task, the advertiser portal generates the advertisement material identifier, and the advertiser portal writes the advertisement task into the database for storage. In the technical solution, the advertisement task is generated in the advertising system, thereby providing a premise and a possibility for a client and the advertisement server jointly control the target advertisement to be displayed subsequently.

FIG. 10 is a schematic structural diagram of an embodiment of a terminal according to embodiments of this application. As shown in FIG. 10, the terminal includes a sending module 1001, a receiving module 1002, and a processing module 1003.

In some embodiments of this application, the sending module 1001 is configured to send a first advertisement request to an advertisement server. The first advertisement request includes a device identifier of the terminal and an advertisement slot identifier of a first client on the terminal.

The receiving module 1002 is configured to receive a target advertisement and first permission information that are returned by the advertisement server according to the first advertisement request. The first permission information is permission information that is determined by the advertisement server based on the device identifier and that is used to instruct the first client to display the target advertisement.

The processing module 1003 is configured to control, based on the first permission information, the target advertisement to be displayed on the first client.

In some embodiments of this application, the first permission information is determined by the advertisement server after the advertisement server queries the terminal for statistical information of the target advertisement based on the device identifier, and the statistical information includes advertisement display information of all clients on the terminal that display the target advertisement.

In some other embodiments of this application, the sending module 1001 is further configured to: after the first client displays the target advertisement, report an advertisement display notification to the advertisement server, so that the advertisement server updates the statistical information of the target advertisement based on the advertisement display notification.

The advertisement display notification includes the device identifier of the terminal, the advertisement slot identifier of the first client, and a material identifier of the target advertisement.

In the foregoing embodiment of this application, the sending module 1001 is further configured to send a second advertisement request to the advertisement server, so that the advertisement server determines, based on updated statistical information of the target advertisement, second permission information that is used to instruct a second client on the terminal to display the target advertisement.

The second advertisement request includes the device identifier of the terminal and an advertisement slot identifier of the second client on the terminal.

In still some embodiments of this application, the first permission information includes display frequency information and valid display time information.

In still some embodiments of this application, the processing module 1003 is specifically configured to: cache the target advertisement and the first permission information into a directory corresponding to the first client; and control, based on the display frequency information, the first client to display the target advertisement within a time range corresponding to the valid display time information.

In still some embodiments of this application, the first advertisement request further includes a material identifier list cached into the directory corresponding to the first client.

Correspondingly, the first permission information further includes permission information that is determined by the advertisement server based on the device identifier and that is used to instruct the first client to display an advertisement corresponding to each material identifier in the material identifier list.

In still some embodiments of this application, when the first permission information is invalid permission, the processing module 1003 is further configured to remove an advertisement corresponding to the invalid permission from the directory corresponding to the first client.

The terminal provided in this embodiment of this application may be configured to execute the technical solution of the embodiment of the advertisement display control method shown in FIG. 2. Implementation principles and beneficial effects thereof are similar, and details are not described herein again.

Figure 11:
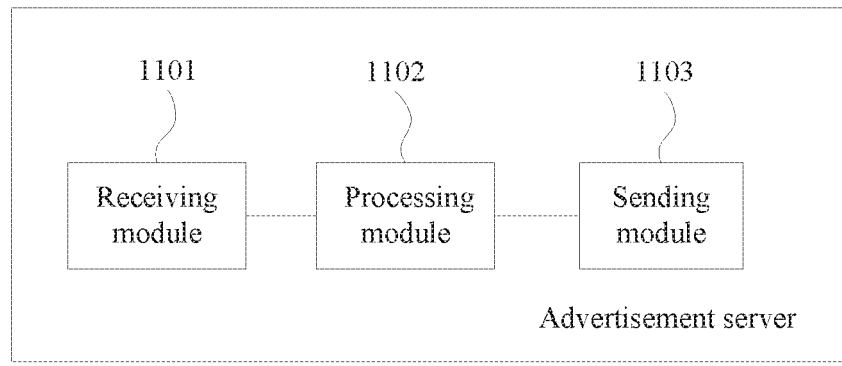
FIG. 11 is a schematic structural diagram of an embodiment of an advertisement server according to embodiments of this application.

FIG. 11 is a schematic structural diagram of an embodiment of an advertisement server according to embodiments of this application. As shown in FIG. 11, the terminal includes a receiving module 1101, a processing module 1102, and a sending module 1103.

In this embodiment of this application, the receiving module 1101 is configured to receive a first advertisement request sent by the terminal. The first advertisement request includes a device identifier of the terminal and an advertisement slot identifier of a first client on the terminal.

The processing module 1102 is configured to determine a target advertisement and first permission information according to the first advertisement request. The first permission information is permission information that is determined by the advertisement server based on the device identifier and that is used to instruct the first client to display the target advertisement.

The sending module 1103 is configured to return the determined target advertisement and the determined first permission information to the terminal, so that the terminal controls, based on the first permission information, the target advertisement to be displayed on the first client.

In some embodiments of this application, the processing module 1102 is specifically configured to: query the terminal for statistical information of the target advertisement based on the device identifier, and determine the first permission information based on the statistical information of the target advertisement. The statistical information includes advertisement display information of all clients on the terminal that display the target advertisement.

In some other embodiments of this application, the receiving module 1101 is further configured to: after the first client displays the target advertisement, receive an advertisement display notification reported by the terminal; and update the statistical information of the target advertisement based on the advertisement display notification. The advertisement display notification includes the device identifier of the terminal, the advertisement slot identifier of the first client, and a material identifier of the target advertisement.

In still some embodiments of this application, the receiving module 1101 is further configured to receive a second advertisement request sent by the terminal. The second advertisement request includes the device identifier of the terminal and an advertisement slot identifier of a second client on the terminal.

Correspondingly, the processing module 1102 is further configured to query the terminal for updated statistical information of the target advertisement according to the second advertisement request, to determine second permission information. The second permission information is used to instruct the terminal to control the target advertisement to be displayed on the second client.

In still some embodiments of this application, the first permission information includes display frequency information and valid display time information.

In still some embodiments of this application, the first advertisement request further includes a material identifier list cached into a directory corresponding to the first client.

Correspondingly, the first permission information further includes permission information that is determined by the advertisement server based on the device identifier and that is used to instruct the first client to display an advertisement corresponding to each material identifier in the material identifier list.

In still some embodiments of this application, if the first permission information is invalid permission, the processing module 1102 is further configured to: generate a user flag based on the device identifier in the first advertisement request; generate a total-times search keyword based on the user flag and each material identifier in the material identifier list, where a format of the total-times search keyword is consistent with a format of a statistical-information keyword in a memory; query the memory for statistical information of each material identifier in the material identifier list based on the total-times search keyword, to determine a total quantity of displayed times, on all the clients on the terminal within an advertisement delivery period, of the advertisement corresponding to each material identifier; and determine permission information of an advertisement whose total quantity of displayed times within the advertisement delivery period is greater than or equal to a preset total quantity of display times as the invalid permission.

The advertisement server provided in this embodiment of this application may be configured to execute the technical solutions of the embodiments of the advertisement display control method shown in FIG. 3 to FIG. 7. Implementation principles and beneficial effects thereof are similar, and details are not described herein again.

It should be noted that, the division of modules of the devices (the terminal and the advertisement server) is merely logical function division, and during actual implementation, some or all modules may be integrated into one physical entity, or the modules may be physically separated. In addition, all the modules may be implemented by invoking software by a processing element; or all the modules may be implemented by hardware; or some modules may be implemented by invoking software by a processing element, and some modules may be implemented by hardware. For example, a determining module may be an independently disposed processing element, or may be integrated into a chip of the foregoing device for implementation. In addition, the determining module may alternatively be stored in a memory of the foregoing device in a form of program code, and is invoked by a processing element of the foregoing device, to execute the foregoing functions of the determining module. Implementations of other modules are similar to the implementation of the determining module. In addition, all or some of the modules may be integrated, or may be implemented independently. The processing element described herein may be an integrated circuit with a signal processing capability. In an implementation process, the steps of the foregoing methods or the foregoing modules may be implemented by using an integrated logic circuit of hardware in the processing element or by using a software instruction.

For example, the foregoing modules may be configured as one or more integrated circuits that implement the foregoing methods, such as one or more application-specific integrated circuits (Application Specific Integrated Circuit, ASIC), one or more microprocessors (digital signal processor, DSP), or one or more field programmable gate arrays (Field Programmable Gate Array, FPGA). For another example, when one of the foregoing modules is implemented by invoking program code by the processing element, the processing element may be a general-purpose processor, such as a central processing unit (Central Processing Unit, CPU), or another processor that can invoke the program code. For still another example, these modules may be integrated together and implemented in a system-on-a-chip (system-on-a-chip, SOC) form.

All or some of the foregoing embodiments may be implemented by using software, hardware, firmware, or any combination thereof. When software is used to implement the embodiments, the embodiments may be implemented completely or partly in a form of a computer program product. The computer program product includes one or more computer instructions. When the computer program instructions are loaded and executed on a computer, some or all of the procedures or functions according to the embodiments of this application are generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, a computer, a server, or a data center to another website, another website, another computer, another server, or another data center in a wired (for example, a coaxial cable, an optical fiber, or a digital subscriber line (DSL)) or wireless (for example, infrared, radio, or microwave) manner. The computer readable storage medium may be any usable medium that can be accessed by the computer, or may be a data storage device, such as a server or a data center, into which one or more usable media are integrated. The usable medium may be a magnetic medium (for example, a floppy disk, a hard disk, or a magnetic tape), an optical medium (for example, a DVD), a semiconductor medium (for example, a solid state disk, solid state disk (SSD)), or the like.

Figure 12:
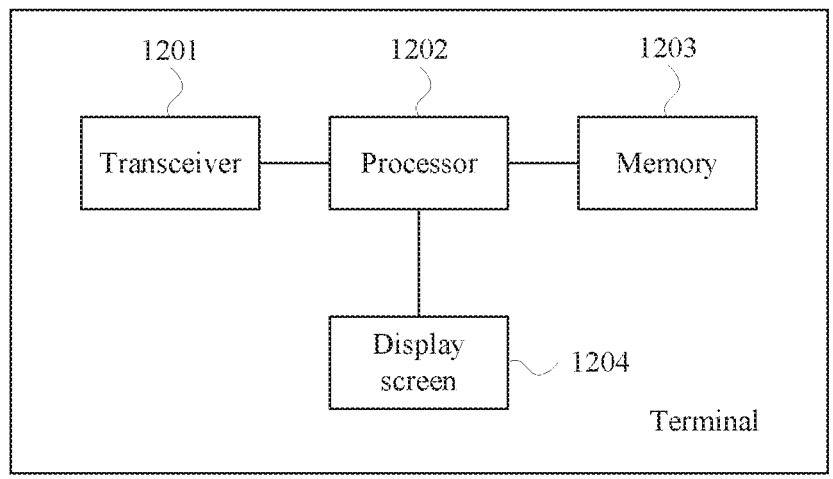
FIG. 12 is another schematic structural diagram of a terminal according to an embodiment of this application.

FIG. 12 is another schematic structural diagram of a terminal according to an embodiment of this application. The terminal provided in this embodiment of this application may be configured to implement operations of the terminal in the embodiment of the advertisement display control method. As shown in FIG. 12, for example, the terminal is a mobile phone. The terminal may include a transceiver 1201, a processor 1202, a memory 1203, and a display screen 1204.

A person skilled in the art can understand that a structure of the terminal shown in FIG. 12 does not constitute a limitation on the terminal, and the terminal may include more or fewer components than those shown in the figure, or a combination of some components, or the components disposed differently.

Specific implementations of the transceiver 1201, the processor 1202, the memory 1203, and the display screen 1204 are not specifically limited in this embodiment of this application. For example, the transceiver 1201 may be implemented by using a radio frequency (radio frequency, RF) circuit. The RF circuit may be configured to receive and send a signal in an information receiving and sending process. The RF circuit may include but is not limited to an antenna, at least one amplifier, a transceiver, a coupler, a low noise amplifier (low noise amplifier, LNA), a duplexer, and the like. The memory 1203 may include a high-speed random access memory, or may include a non-volatile memory such as at least one magnetic disk storage device, a flash memory device, or another volatile solid-state storage device. The memory 1203 may be configured to store data, a software program, and a module. The processor 1202 is a control center of the terminal, executes various function applications of the terminal and data processing by running the software program and the module that are stored in the memory 1203. The display screen 1204 may be configured to display information entered by a user or information provided to a user, and various menus of the terminal. The display screen 1204 may include a touch panel. After the touch panel detects a touch operation on or near the touch panel, the touch panel transmits a signal to the processor 1202.

Specifically, in FIG. 10, the sending module 1001 and the receiving module 1002 are corresponding to the transceiver 1201, and the processing unit 1003 is corresponding to the processor 1202, and the like.

Figure 13:
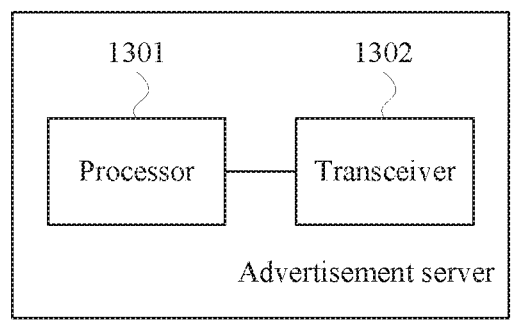
FIG. 13 is a schematic structural diagram of another advertisement server according to an embodiment of this application.

FIG. 13 is a schematic structural diagram of another advertisement server according to an embodiment of this application. The advertisement server provided in this embodiment of this application may be configured to implement operations of the advertisement server in the foregoing advertisement display control method. As shown in FIG. 13, the advertisement server provided in this embodiment includes a processor 1301 and a transceiver 1302. Optionally, the advertisement server may further include a memory, and the memory is configured to store an executable instruction of the processor 1301. Optionally, the transceiver 1302 may be implemented by a transmitter and a receiver with an independent function. Both the transmitter and the receiver can be implemented by using an antenna. This is not limited in this embodiment of this application. The processor 1301 and the transceiver 1302 are configured to run a computer executable instruction, so that the advertisement server executes the steps of the advertisement display control methods in the embodiments shown in FIG. 3 to FIG. 7.

Specifically, in FIG. 11, both the receiving module 1101 and the sending module 1103 may be corresponding to the transceiver 1302, the processing unit 1102 may be corresponding to the processor 1301, and the like.

Figure 14:
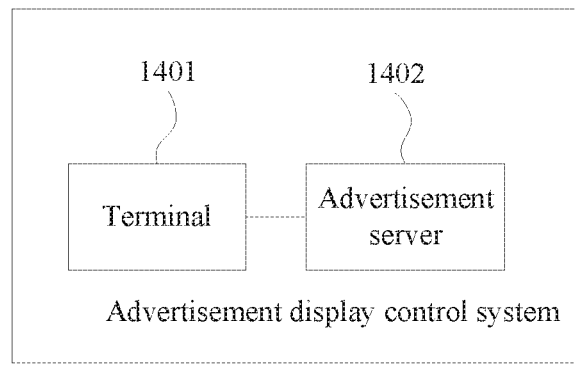
FIG. 14 is a schematic structural diagram of an advertisement display control system according to an embodiment of this application.

FIG. 14 is a schematic structural diagram of an advertisement display control system according to an embodiment of this application. As shown in FIG. 14, the advertisement display control system provided in this embodiment of this application may include a terminal 1401 and an advertisement server 1402. The terminal 1401 may be the terminal provided in the embodiment shown in FIG. 10, and the advertisement server 1402 may be the advertisement server provided in the embodiment shown FIG. 11. Alternatively, the terminal 1401 may be the terminal provided in the embodiment shown in FIG. 12, and the advertisement server 1402 may be the advertisement server provided in the embodiment shown FIG. 13. The advertisement display control system provided in this embodiment of this application may be configured to implement the foregoing advertisement display control method.

Quantities of the terminal 1401 and the advertisement server 1402 are not limited in this embodiment of this application. Optionally, if there are a plurality of terminals 1401, each terminal 1401 may exchange an advertisement message with the advertisement server 1402.

In the advertisement display control system provided in this embodiment of this application, the included terminal is configured to execute the operations performed by the terminal in the method embodiment shown in FIG. 2, and the included advertisement server is configured to execute the operations performed by the advertisement server in the method embodiments shown in FIG. 3 to FIG. 7. Implementation principles and beneficial effects thereof are similar, and details are not described herein again.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraints of the technical solutions. A person skilled in the art may use different methods to implement the described functions for each particular application, but it should not be considered that the implementation goes beyond the scope of this application.

What is claimed is:

1. An advertisement system comprising:
an electronic device configured to:
send, at a first moment, a first request for displaying an advertisement on a first client of the electronic device;
send, at a second moment that is later than the first moment, a second request for displaying the advertisement on a second client of the electronic device; and
send, at a third moment that is later than the second moment, a third request for displaying the advertisement on the first client; and
a server communicatively coupled to the electronic device and configured to:

determine that display times of displaying, the advertisement on the first client and the second client before the first moment do not exceed a preset threshold;
instruct the electronic device to display the advertisement on the first client when the display times of displaying the advertisement on the first client and the second client before the first moment do not exceed the preset threshold;
determine that display times of displaying the advertisement on the first client and the second client before the second moment do not exceed the preset threshold;
instruct the electronic device to display the advertisement on the second client when the display times of displaying; the advertisement on the first client and the second client before the second moment do not exceed the preset threshold;
determine that display times of displaying the advertisement on the first client and the second client before the third moment are equal to or exceed the preset threshold; and
instruct the electronic device not to display the advertisement on the first client when the display tires of displaying the advertisement on the first client and the second client before the third moment are equal to or exceed the reset threshold.

2. The advertisement system of claim 1, wherein the electronic device is further configured to report a display notification to the server after the advertisement is displayed on the first client or the second client.

3. The advertisement system of claim 2, wherein the server is configured to update the display times for displaying the advertisement on the first client and the second client based on the display notification.

4. The advertisement system of claim 1, wherein each of the first request, the second request, and the third request comprises a material identifier corresponding to the advertisement.

5. The advertisement of claim 1, wherein the server is further configured to send permission information to the electronic device, wherein the permission information comprises at least one of a display frequency or a valid display time associated with the first client or the second client.

6. The advertisement system of claim 1, wherein the electronic device is further configured to cache the advertisement into a first directory corresponding to the first client or a second directory corresponding t d the second client.

7. The advertisement system of claim 1, wherein the electronic device is further configured to report a click notification to the server when a user clicks a displayed advertisement.

8. An advertisement method used in an advertisement system comprising a server and an electronic device, the method comprising:
sending, by the electronic device to the server at a first moment, a first request for displaying an advertisement on a first client of the electronic device;
determining, by the server, that display times of displaying the advertisement on the first client and a second client of the electronic device before the first moment do not exceed a preset and threshold;
instructing, by the server, the electronic device to display the advertisement on the first client when the display times of displaying the advertisement on the first client and the second client before the first moment do not exceed the preset threshold;

sending, by the electronic device to the server at a second moment that is later than the first moment, a second request for displaying the advertisement on the second client;

determining, by the server, that display times of displaying the advertisement on the first client and the second client before the second moment do not exceed the preset threshold;

instructing, by the server, the electronic device to display the advertisement on the second client when the display times of displaying the advertisement on the first client and the second client before the second moment do not exceed the preset threshold;

sending, by the electronic device to the server at a third moment that is later than the second moment, a third request for displaying the advertisement on the first client moment;

determining, by the server, that display times of displaying the advertisement on the first client and the second client before the third moment are equal to or exceed the preset threshold; and instructing, by the server, the electronic device not to display the advertisement on the first client when the display times of displaying the advertisement on the first client and the second client before the third moment are equal to or exceed the present threshold.

9. The method of claim 8, further comprising reporting, by the electronic device, a display notification to the server after the advertisement is displayed on the first client or the second client.

10. The method of claim 9, further comprising updating, by the server, the display times of displaying the advertisement on the first and second clients based on the display notification.

11. The method of claim 8, each of the first request, the second request, and the third request comprises a material identifier corresponding to the advertisement.

12. The method of claim 8, further comprising sending, by the server, permission information to the electronic device, wherein the permission information comprises at least one of a display frequency or a valid display time associated with the first client or the second client.

13. The method of claim 8, further comprising caching, by the electronic device, the advertisement into a first directory corresponding to the first client or a second directory corresponding to the second client.

14. The method of claim 13, further comprising reporting, by the electronic device, a click notification to the server when a user clicks the advertisement.

15. A server, comprising:
a transceiver configured to:
receive, from an electronic device at a first moment a first request for displaying an advertisement on a first client of the electronic device;
receive, at a second moment that is later than the first moment, a second request for displaying the advertisement on a second client of the electronic device; and
receive, at a third moment that is later than the second moment, a third request for displaying the advertisement on the first client; and a processor coupled to the transceiver and configured to;
determine that display times for displaying the advertisement on the first client and the second client before the first moment do not exceed a preset threshold;
instruct the electronic device to display the advertisement on the first client when the display times for displaying the advertisement on the first client and the second client before the first moment do not exceed the preset threshold;
determine at display times of displaying the advertisement on the first client and the second client before the second moment do not exceed the preset threshold;
instruct the electronic device to display the advertisement on the first client when the display times for displaying the advertisement on the first client and the second client before the second moment do not exceed the preset threshold;
determine that display times of displaying the advertisement on the first client and the second client before the third moment is equal to or exceeds the preset threshold; and
instruct the electronic device not to display the advertisement on the first client when the display time of displaying the advertisement on the first client and the second client before the third moment is equal to or exceeds the preset threshold.

16. The server of claim 15, wherein the transceiver is further configured to receive a display notification sent by the electronic device after the advertisement is displayed on the first client or the second client.

17. The server of claim 16, wherein the processor is further configured to update the display times of displaying the advertisement on the first client and the second client based on the display notification.

18. The server of claim 15, wherein the transceiver is further configured to send permission information to the electronic device, wherein the permission information comprises at least one of a display frequency or a valid display time associated with the first or second client.

19. The server of claim 15, wherein the first request comprises a material identifier corresponding to the advertisement.

20. The server of claim 19, wherein the processor is configured to determine that the display times of displaying the advertisement on the first client and the second client before the first moment does not exceed the preset threshold based on the material identifier.

* * * * *

UNITED STATES PATENT AND TRADEMARK OFFICE
CERTIFICATE OF CORRECTION

PATENT NO. : 10,937,056 B2  
APPLICATION NO. : 16/479771  
DATED : March 2, 2021  
INVENTOR(S) : Huangang Pang and Yingbo Hu Page 1 of 1

It is certified that error appears in the above-identified patent and that said Letters Patent is hereby corrected as shown below:

In the Claims

Claim 1, Column 40, Line 24: "display tires of" should read "display times of"

Claim 1, Column 40, Line 27: "exceed the reset threshold" should read "exceed the preset threshold"

Claim 11, Column 41, Line 37: "claim 8, each of" should read "claim 8, wherein each of"

Claim 15, Column 42, Line 31: "display time of" should read "display times of"

Signed and Sealed this  
Twenty-seventh Day of April, 2021

Drew Hirshfeld  
*Performing the Functions and Duties of the*  
*Under Secretary of Commerce for Intellectual Property and*  
*Director of the United States Patent and Trademark Office*